(12) United States Patent
Okamoto et al.

(10) Patent No.: US 8,003,744 B2
(45) Date of Patent: Aug. 23, 2011

(54) CURING COMPOSITION WITH IMPROVED HEAT RESISTANCE

(75) Inventors: Toshihiko Okamoto, Akashi (JP); Katsuyu Wakabayashi, Nishinomiya (JP)

(73) Assignee: Kaneka Corporation, Osaka (JP)

( * ) Notice: Subject to any disclaimer, the term of this patent is extended or adjusted under 35 U.S.C. 154(b) by 198 days.

(21) Appl. No.: 10/568,616

(22) PCT Filed: Aug. 12, 2004

(86) PCT No.: PCT/JP2004/012029
§ 371 (c)(1),
(2), (4) Date: Feb. 16, 2006

(87) PCT Pub. No.: WO2005/019345
PCT Pub. Date: Mar. 3, 2005

(65) Prior Publication Data
US 2006/0199933 A1 Sep. 7, 2006

(30) Foreign Application Priority Data
Aug. 25, 2003 (JP) ................. 2003-300661

(51) Int. Cl.
*C08G 77/08* (2006.01)
(52) U.S. Cl. ............... 528/18; 528/12; 528/44; 528/45; 528/48; 528/55; 528/58; 528/59
(58) Field of Classification Search .................... 528/12, 528/18, 44–45, 48, 55, 58, 59
See application file for complete search history.

(56) References Cited

U.S. PATENT DOCUMENTS

| | | | |
|---|---|---|---|
| 3,632,557 A * | 1/1972 | Brode et al. ................. 528/28 |
| 3,661,885 A * | 5/1972 | Haddick et al. ............... 528/53 |
| 3,857,825 A | 12/1974 | Streck et al. |
| 3,888,815 A | 6/1975 | Bessmer et al. |
| 3,971,751 A | 7/1976 | Isayama et al. |
| 4,449,938 A | 5/1984 | Pollak |
| 4,472,551 A | 9/1984 | White et al. |
| 4,477,628 A | 10/1984 | Kato et al. |
| 4,507,469 A | 3/1985 | Mita et al. |
| 4,559,387 A | 12/1985 | Endo et al. |
| 4,562,237 A | 12/1985 | Okuno et al. |
| 4,683,250 A | 7/1987 | Mikami |
| 4,720,530 A | 1/1988 | Wurminghausen et al. |
| 4,818,790 A | 4/1989 | Ooka et al. |
| 4,873,305 A | 10/1989 | Cavezzan et al. |
| 4,910,255 A | 3/1990 | Wakabayashi et al. |
| 4,954,565 A | 9/1990 | Liles |
| 4,960,844 A * | 10/1990 | Singh ............................ 528/17 |
| 4,977,228 A | 12/1990 | Wakabayashi et al. |
| 5,378,734 A | 1/1995 | Inoue |
| 5,399,607 A | 3/1995 | Nanbu et al. |
| 5,554,709 A * | 9/1996 | Emmerling et al. ............. 528/27 |
| 5,639,825 A | 6/1997 | Nanbu et al. |
| 5,648,427 A | 7/1997 | Fujita et al. |
| 5,756,751 A | 5/1998 | Schmalstieg et al. |
| 5,807,921 A | 9/1998 | Hill et al. |
| 5,986,014 A | 11/1999 | Kusakabe et al. |
| 6,197,912 B1 | 3/2001 | Huang et al. |
| 6,204,350 B1 | 3/2001 | Liu et al. |
| 6,207,766 B1 | 3/2001 | Doi et al. |
| 6,271,309 B1 | 8/2001 | Roberts et al. |
| 6,287,701 B1 | 9/2001 | Oochi et al. |
| 6,350,345 B1 * | 2/2002 | Kotani et al. .................. 156/329 |
| 6,369,187 B1 | 4/2002 | Fujita et al. |
| 6,410,640 B1 * | 6/2002 | Fukunaga et al. ............. 524/588 |
| 6,569,980 B1 | 5/2003 | Masaoka et al. |
| 6,642,309 B2 | 11/2003 | Komitsu et al. |
| 6,703,442 B1 | 3/2004 | Ando et al. |
| 6,720,373 B2 | 4/2004 | Lin et al. |
| 6,884,852 B1 | 4/2005 | Klauck et al. |
| 7,115,695 B2 * | 10/2006 | Okamoto et al. ................ 528/14 |
| 2002/0016411 A1 | 2/2002 | Ando et al. |
| 2002/0048680 A1 | 4/2002 | Yamanaka |
| 2002/0086942 A1 | 7/2002 | Fujita et al. |
| 2002/0115811 A1 | 8/2002 | Huang et al. |
| 2003/0096904 A1 | 5/2003 | Hakuta et al. |
| 2003/0105261 A1 * | 6/2003 | Komitsu et al. ................. 528/10 |
| 2003/0176576 A1 | 9/2003 | Fujita et al. |
| 2004/0181025 A1 | 9/2004 | Schindler et al. |
| 2004/0266950 A1 | 12/2004 | Yano et al. |
| 2006/0128919 A1 | 6/2006 | Okamoto et al. |
| 2006/0252943 A1 | 11/2006 | Wakabayashi et al. |
| 2006/0264545 A1 | 11/2006 | Wakabayashi et al. |
| 2007/0167583 A1 | 7/2007 | Yano et al. |

FOREIGN PATENT DOCUMENTS

| | | |
|---|---|---|
| EP | 0 420 522 A2 | 4/1991 |
| EP | 0 473 793 A1 | 3/1992 |
| EP | 0 538 881 A2 | 4/1993 |
| EP | 0538881 A2 * | 4/1993 |
| EP | 0 546 314 A2 | 6/1993 |
| EP | 0 673 972 A1 | 9/1995 |
| EP | 0 918 062 A1 | 5/1999 |
| EP | 1 000 980 A1 | 5/2000 |
| EP | 1 024 170 A1 | 8/2000 |
| EP | 1 285 946 A1 | 2/2003 |
| EP | 1 445 287 A1 | 8/2004 |

(Continued)

*Primary Examiner* — Kuo-Liang Peng
(74) *Attorney, Agent, or Firm* — Sughrue Mion, PLLC

(57) ABSTRACT

The present invention provides a curable composition including: an organic polymer (A) which has on average 1.1 to 50 groups per one molecule thereof each represented by the general formula (1) and has one or more silicon-containing functional groups capable of cross-linking by forming siloxane bonds:

$$-NR^1-C(=O)- \qquad (1)$$

wherein $R^1$ is a hydrogen atom, or a substituted or unsubstituted monovalent organic group; and a metal carboxylate and/or a carboxylic acid (B), the curable composition giving a cured article excellent in curability and also excellent in heat resistance although a non-organotin catalyst is used.

11 Claims, No Drawings

FOREIGN PATENT DOCUMENTS

| | | |
|---|---|---|
| EP | 1 471 113 A1 | 10/2004 |
| EP | 1 550 700 A1 | 7/2005 |
| JP | 55-009669 A | 1/1980 |
| JP | 62-13452 A | 1/1987 |
| JP | 3-122163 A | 5/1991 |
| JP | 4-154829 A | 5/1992 |
| JP | 4-202481 A | 7/1992 |
| JP | 4-292616 A | 10/1992 |
| JP | 5-39428 A | 2/1993 |
| JP | 05-117519 A | 5/1993 |
| JP | 6-88029 A | 3/1994 |
| JP | 06-157754 A | 6/1994 |
| JP | 6-322251 A | 11/1994 |
| JP | 8-127724 A | 5/1996 |
| JP | 9-12860 A | 1/1997 |
| JP | 09-141193 A | 6/1997 |
| JP | 9-183902 A | 7/1997 |
| JP | 9-272714 A | 10/1997 |
| JP | 10-053637 A | 2/1998 |
| JP | 2880728 B | 1/1999 |
| JP | 11-100433 A | 4/1999 |
| JP | 11-130931 A | 5/1999 |
| JP | 2000-109678 A | 4/2000 |
| JP | 2000-119488 A | 4/2000 |
| JP | 2000-136313 A | 5/2000 |
| JP | 2000-345054 A | 12/2000 |
| JP | 3062626 B2 | 12/2000 |
| JP | 2001-019842 A | 1/2001 |
| JP | 2001-031947 A | 2/2001 |
| JP | 2001-072855 A | 3/2001 |
| JP | 2001-163918 A | 6/2001 |
| JP | 2001-172515 A | 6/2001 |
| JP | 2001-181532 A | 7/2001 |
| JP | 2001-342363 A | 12/2001 |
| JP | 2002-20458 A | 1/2002 |
| JP | 2002-155145 A | 5/2002 |
| JP | 2002-155201 A | 5/2002 |
| JP | 2002-285018 A | 10/2002 |
| JP | 2006-316287 A | 11/2006 |
| JP | 4101632 B2 | 3/2008 |
| JP | 2008-150627 A | 7/2008 |
| JP | 4150220 B2 | 7/2008 |
| JP | 2008-179830 A | 8/2008 |
| WO | 99/48942 A1 | 9/1999 |
| WO | 00/56817 A1 | 9/2000 |
| WO | 00 56818 * | 9/2000 |
| WO | WO 03011978 * | 2/2003 |
| WO | WO03011978 A1 * | 2/2003 |
| WO | 2004/031299 A1 | 4/2004 |
| WO | 2004/031300 A1 | 4/2004 |

* cited by examiner

CURING COMPOSITION WITH IMPROVED HEAT RESISTANCE

RELATED APPLICATION

This application is a national stage of International Application No. PCT/JP2004/012029 filed on Aug. 12, 2004, claiming priority based on Japanese Application No. 2003-300661 filed on Aug. 25, 2003, the contents of which are incorporated herein by reference in their entirety.

1. Technical Field

The present invention relates to a curable composition including an organic polymer having silicon-containing functional groups (hereinafter also referred to as "reactive silicon groups") capable of cross-linking by forming siloxane bonds.

2. Background Art

There have hitherto been known organic polymers with the molecular chain terminals thereof capped with reactive silicon groups by taking advantage of the high reactivity between the isocyanate group and various types of active hydrogen groups, and accordingly, properties of urethane resins have been improved.

These organic polymers have already been produced industrially, and used in wide applications as sealants and adhesives.

Curable compositions including these organic polymer are cured with silanol condensation catalysts, and organotin catalysts such as dibutyltin dilaurylate are widely used. However, cured articles obtained from the curable compositions each including any of the organic polymers and an organotin catalyst are poor in heat resistance, leading to a problem that physical properties of the cured articles are largely degraded by heating. Additionally, organotin catalysts having carbon-tin bonds have recently been pointed out to be toxic.

Techniques for improving the heat resistance by structural alteration of the organic polymers are disclosed in Japanese Patent Laid-Open Nos. 10-53637 and 2001-31947, U.S. Pat. No. 6,197,912, Japanese Patent Laid-Open No. 2002-155145, and the like. However, even the use of these techniques sometimes has not resulted in sufficient heat resistance.

On the other hand, curable compositions in which carboxylic acids or metal carboxylates are used as the curing catalysts for polyoxyalkylene polymers having reactive silicon groups are disclosed in Japanese Patent Laid-Open No. 55-9669, Japanese Patent No. 3062626, Japanese Patent Laid-Open Nos. 6-322251, 2000-345054 and 5-117519, and the like. However, there have not hitherto been disclosed specific examples in which carboxylic acids or metal carboxylates are used as the curing catalysts for organic polymers having bonding groups produced by the reaction between isocyanate groups and active hydrogen groups and having reactive silicon groups.

DISCLOSURE OF THE INVENTION

In view of the above described existing circumstances, the present invention takes as its object the provision of a curable composition capable of giving a cured article excellent in heat resistance and curability although a non-organotin catalyst is used.

The present inventors made intensive investigations in an attempt to solve the problems mentioned above and consequently found that the problem of the heat resistance of an organic polymer derived from a group (hereinafter, also referred to as an amide segment) produced by the reaction between an isocyanate group and an active hydrogen group can be improved by using a particular curing catalyst. On the basis of this finding, the present invention has been achieved.

More specifically, the present invention relates to a curable composition including:

an organic polymer (A) which has on average 1.1 to 50 groups per one molecule thereof each represented by the general formula (1) and has one or more silicon-containing functional groups capable of cross-linking by forming siloxane bonds:

$$-NR^1-C(=O)- \qquad (1)$$

wherein $R^1$ is a hydrogen atom, or a substituted or unsubstituted monovalent organic group; and a metal carboxylate and/or a carboxylic acid (B).

A preferred embodiment relates to the above described curable composition, in which the carbon atom adjacent to the carbonyl group of the metal carboxylate and/or of the carboxylic acid (B) is a tertiary or quaternary carbon atom.

Another preferred embodiment relates to the above described curable composition, in which the carbon atom adjacent to the carbonyl group of the metal carboxylate and/or of the carboxylic acid (B) is a quaternary carbon atom.

Still another preferred embodiment relates to any one of the above described curable compositions, in which the component (B) is a carboxylic acid.

Yet another preferred embodiment relates to any one of the above described curable compositions, including the component (B) in an amount of 0.01 to 20 parts by weight in relation to 100 parts by weight of the component (A).

Still yet another preferred embodiment relates to any one of the above described curable compositions, further including an amine compound as a component (C).

Further another preferred embodiment relates to the above described curable compositions, including the component (B) in an amount of 0.01 to 20 parts by weight and the component (C) in an amount of 0.01 to 20 parts by weight, in relation to 100 parts by weight of the component (A).

The curable composition of the present invention is excellent in heat resistance and curability although a non-organotin catalyst is used therein.

BEST MODE FOR CARRYING OUT THE INVENTION

In the following, the present invention will be described in detail.

A reactive silicon group-containing organic polymer (A) to be used in the present invention has on average 1.1 to 50 groups (amide segments) per one molecule thereof each represented by the general formula (1):

$$-NR^1-C(=O)- \qquad (1)$$

wherein $R^1$ is the same as described above. The number of the amide segments on average per one molecule is preferably 1.2 to 25, more preferably 1.5 to 10, and particularly preferably 2 to 5. When smaller than 1.1, the curing rate tends to become slow, sometimes the number of the reactive silicon group introduced into the organic polymer is small, and sometimes satisfactory rubber elasticity is hardly attained. On the other hand, when larger than 50, sometimes the organic polymer is high in viscosity to give a composition poor in workability.

As the amide segment, groups produced by the reactions of an isocyanate group with various types of active hydrogen-containing groups are preferable because they provide a marked improvement effect of the heat resistance in the present invention. Specific examples of the amide segment may include: a urethane group, produced by a reaction between an isocyanate group and a hydroxy group, represented by a general formula (2), $$—NH—C(=O)—O— \quad (2);$$

a urea group, produced by a reaction between an isocyanate group and an amino group, represented by a general formula (3), $$—NH—C(=O)—NR^2— \quad (3),$$

wherein $R^2$ represents a hydrogen atom, or a substituted or unsubstituted monovalent organic group; and a thiourethane group, produced by a reaction between an isocyanate group and a mercapto group, represented by a general formula (4), $$—NH—C(=O)—S— \quad (4).$$

In the present invention, those groups produced by the further reactions between the active hydrogen in these urethane, urea and thiourethane groups with an isocyanate group are also included in the groups represented by the general formula (1).

The reactive silicon group contained in the organic polymer (A) has a hydroxy or hydrolyzable groups bonded to a silicone atoms, and is a group capable of cross-linking by forming siloxane bonds on the basis of a reaction to be accelerated by a silanol condensation catalyst. Examples of the reactive silicon group may include the group represented by the general formula (5):

$$—(SiR^3{}_{2-b}X_bO)_n—SiR^4{}_{3-a}X_a \quad (5)$$

wherein $R^3$ and $R^4$ each are independently an alkyl group having 1 to 20 carbon atoms, an aryl group having 6 to 20 carbon atoms, an aralkyl group having 7 to 20 carbon atoms, or a triorganosiloxy group represented by $(R')_3SiO—$, and when there are two or more $R^3$s and/or $R^4$s, they may be the same or different from each other; here, R' represents a monovalent hydrocarbon group having 1 to 20 carbon atoms, and 3 R's may be the same or different from each other; X represents a hydroxy group or a hydrolyzable group, and when there are two or more Xs, they may be the same or different from each other; a represents 0, 1, 2 or 3; b represents 0, 1 or 2; b's in n $(SiR^3{}_{2-b}X_bO)$ groups may be the same or different from each other; n represents an integer of 0 to 19; and the relation $a+\Sigma b \geqq 1$ is to be satisfied.

No particular constraint is imposed on the hydrolyzable group as long as it is a hydrolyzable group well known in the art. Specific examples of the hydrolyzable group may include, for example, a hydrogen atom, a halogen atom, an alkoxy group, an acyloxy group, a ketoximate group, an amino group, an amide group, an acid amide group, an aminooxy group, a mercapto group and an alkenyloxy group. Among these, a hydrogen atom, an alkoxy group, an acyloxy group, a ketoximate group, an amino group, an amide group, an aminooxy group, a mercapto group and an alkenyloxy group are preferable, and an alkoxy group is particularly preferable from the viewpoints of moderate hydrolyzability and easiness in handling.

One to three hydrolyzable and/or hydroxy groups are able to be bonded to one silicon atom, and $(a+\Sigma b)$ preferably falls within a range from 1 to 5. When two or more hydrolyzable and/or hydroxy groups are bonded in a reactive silicon group, they may be the same or different.

In particular, the reactive silicon group represented by the general formula (6) is preferable because of easy availability:

$$—SiR^4{}_{3-c}X_c \quad (6)$$

wherein $R^4$ and X are the same as described above, and c represents an integer of 1 to 3.

Specific examples of $R^3$ and $R^4$ in the general formulas (5) and (6) may include, for example, alkyl groups such as a methyl group and an ethyl group; cycloalkyl groups such as a cyclohexyl group; aryl groups such as a phenyl group; aralkyl groups such as a benzyl group; and triorganosiloxy groups represented by $(R')_3SiO—$ wherein R' is a methyl group, a phenyl group or the like. Among these, a methyl group is particularly preferable.

More specific examples of the reactive silicon group may include: a trimethoxysilyl group, a triethoxysilyl group, a triisopropoxysilyl group, a dimethoxymethylsilyl group, a diethoxymethylsilyl group and a diisopropoxymethylsilyl group. From the viewpoint of high activity and obtainable satisfactory curability, a trimethoxysilyl group, a triethoxysilyl group and a dimethoxymethylsilyl group are more preferable, and a trimethoxysilyl group is particularly preferable. Alternatively, from the viewpoint of storage stability, a dimethoxymethylsilyl group is particularly preferable. Those reactive silicon groups each having 3 hydrolyzable groups bonded to the silicon atom such as a trimethoxysilyl group, a triethoxysilyl group and a triisopropoxysilyl group are particularly preferable from the viewpoints of the recovery properties, durability and creep resistance of the curable composition to be obtained. Additionally, a diethoxymethylsilyl group and a triethoxysilyl group are particularly preferable because the alcohol produced by the hydrolysis reaction of the reactive silicon groups is ethanol which is high in safety.

The reactive silicon groups may be located at the terminals or in the interior, or both at the terminals and in the interior of the molecular chain of the organic polymer (A). In particular, the reactive silicon groups located at the molecular terminals are preferable on the grounds that the effective network chain length in the organic polymer component contained in the finally formed cured article is large, and hence it is easier to obtain a rubber-like cured article having a high strength and a high elongation property, and also on other grounds.

The number of the reactive silicon groups per one molecule of the component (A) is on average preferably 1 to 5, more preferably 1.1 to 4, and particularly preferably 1.2 to 3. When the number of the reactive silicon groups per one molecule is less than 1, sometimes the curability is insufficient and a satisfactory rubber elasticity behavior tends to be hardly attained, while when larger than 5, sometimes the elongation of the cured article is small.

No particular constraint is imposed on the organic polymer (A) and the organic polymer (A) may be a polymer obtained by any production method as long as the organic polymer (A) has on average 1.1 to 50 groups per one molecule represented by the general formula (1), $$—NR^1—C(=O)— \quad (1)$$

wherein $R^1$ is the same as described above, and has one or more reactive silicon groups.

As an example of the industrial methods for easily producing the organic polymer (A), here can be cited a method [production method (a)] in which an excessive amount of a polyisocyanate compound (E) is reacted with an organic polymer (D) having active hydrogen-containing groups at the terminals thereof to convert the organic polymer (D) into a polymer having isocyanate groups at the terminals of the polyurethane main chain thereof, and thereafter, or at the same time, the whole isocyanate groups or a part of the isocyanate groups are reacted with the W group of a silicon compound (F) represented by formula (7) to produce the organic polymer (A):

$$W—R^5—SiR^4{}_{3-c}X_c \quad (7)$$

wherein $R^4$, X and c are the same as described above; $R^5$ is a divalent organic group, and is more preferably a substituted or unsubstituted divalent hydrocarbon group having 1 to 20 carbon atoms; W is an active hydrogen-containing group selected from the group consisting of a hydroxy group, a carboxyl group, a mercapto group and an amino group (primary or secondary). Examples of the production methods, well known in the art, of organic polymers related to the production method (a) may include Japanese Patent Publication No. 46-12154 (U.S. Pat. No. 3,632,557); Japanese Patent Laid-Open Nos. 58-109529 (U.S. Pat. No. 4,374,237), 62-13430 (U.S. Pat. No. 4,645,816), 8-53528 (EP0676403) and 10-204144 (EP0831108); National Publication of International Patent Application No. 2003-508561 (U.S. Pat. No. 6,197,912); Japanese Patent Laid-Open Nos. 6-211879 (U.S. Pat. No. 5,364,955), 10-53637 (U.S. Pat. No. 5,756,751), 11-100427, 2000-169544, 2000-169545 and 2002-212415; Japanese Patent No. 3313360; U.S. Pat. Nos. 4,067,844 and 3,711,445; and Japanese Patent Laid-Open No. 2001-323040.

As another example, here can be cited a method [production method (b)] in which an hydrolyzable silicon group-containing isocyanate compound (G) represented by formula (8) is reacted with the organic polymer (D) having active hydrogen-containing groups at the terminals thereof to produce the organic polymer (A)):

$$O=C=N-R^5-SiR^4{}_{3-c}X_c \quad (8)$$

wherein $R^4$, $R^5$, X and c are the same as described above. Examples of the production methods, well known in the art, of organic polymers related to the production method (b) may include Japanese Patent Laid-Open Nos. 11-279249 (U.S. Pat. No. 5,990,257), 2000-119365 (U.S. Pat. No. 6,046,270), 58-29818 (U.S. Pat. No. 4,345,053), 3-47825 (U.S. Pat. No. 5,068,304), 11-60724, 2002-155145 and 2002-249538.

The production method (a) is more preferable than the production method (b) because the former can produce the polymer (A) at a lower cost than the latter.

Alternatively, the production method (b) is more preferable than the production method (a) because the former can produce the polymer (A) with a smaller number of the amide segments and a more satisfactory heat resistance than the latter.

Examples of the organic polymer (D) having active hydrogen-containing groups at the terminals thereof may include oxyalkylene polymer having hydroxy groups at the terminals thereof (polyether polyol), polyacryl polyol, polyester polyol, saturated hydrocarbon polymer having hydroxy groups at the terminals thereof (polyolefin polyol), polythiol compounds and polyamine compounds. Among these, oxyalkylene polymer, polyacryl polyol and saturated hydrocarbon polymer are preferable because the obtained polymer (A) is relatively low in glass transition temperature and the obtained cured article is excellent low-temperature resistance. Among others, oxyalkylene polymer is particularly preferable because the obtained organic polymer (A) is low in viscosity, satisfactory in workability and satisfactory in deep-part curability. More preferable are polyacryl polyol and saturated hydrocarbon polymers because the cured article of the obtained organic polymer (A) is satisfactory in weather resistance and heat resistance.

As the oxyalkylene polymer having hydroxy groups at the terminals thereof, oxyalkylene polymers produced by any production methods can be used; however, preferable is an oxyalkylene polymer having at least 0.7 hydroxy group per one molecular terminal thereof, at the terminals thereof, on average over all the molecules. Specific examples of such an oxyalkylene polymer may include an oxyalkylene polymer produced with a conventional alkali metal catalyst, and an oxyalkylene polymer produced by reacting an alkylene oxide with an initiator such as a polyhydroxy compound having at least 2 hydroxy groups in the presence of a double metal cyanide complex or cesium. Examples of the synthesis methods, well known in the art, of polyoxyalkylene polymer may include: a polymerization method based on a transition metal compound-porphyrin complex catalyst such as a complex prepared by reacting an organoaluminum compound with porphyrin, disclosed in Japanese Patent Laid-Open No. 61-215623; polymerization methods based on double metal cyanide complex catalysts, disclosed in Japanese Patent Publication Nos. 46-27250 and 59-15336, and U.S. Pat. Nos. 3,278,457, 3,278,458, 3,278,459, 3,427,256, 3,427,334, 3,427,335 and the like; a polymerization method using a catalyst composed of a polyphosphazene salt disclosed in Japanese Patent Laid-Open No. 10-273512, and a polymerization method using a catalyst composed of a phosphazene compound disclosed in Japanese Patent Laid-Open No. 11-060722. However, the synthesis method of polyoxyalkylene polymer is not limited to these examples.

Among these polymerization methods, the polymerization methods using alkali metal catalysts or double metal cyanide complexes are preferable because the polymerization catalysts used are low in price.

Among the above described polymerization methods, the polymerization methods using the double metal cyanide complexes are preferable because these methods can give oxyalkylene polymers lower in unsaturation degree, narrower in Mw/Mn, lower in viscosity, higher in acid resistance and higher in weather resistance than conventional oxyalkylene polymers produced by use of alkali metal catalysts.

Additionally, the methods using the double metal cyanide complexes are preferable because these methods can produce oxyalkylene polymers higher in molecular weight than the oxyalkylene polymers produced by use of alkali metal catalysts or phosphazene compound catalysts, and can give cured articles higher in elongation.

As the double metal cyanide complex, those complexes having zinc hexacyanocobaltate as the main component are preferable, and ether and/or alcohol complexes thereof are preferable. As the compositions of such complexes, essentially those compositions as described in Japanese Patent Publication No. 46-27250 can be used. As ethers, tetrahydrofuran, and glymes such as glyme and diglyme are preferable, and among these, tetrahydrofuran and glyme are preferable because these can give oxyalkylene polymers narrower in Mw/Mn and lower in unsaturation degree. As alcohols, t-butanol as described in Japanese Patent Laid-Open No. 4-145123 is preferable because it gives oxyalkylene polymers lower in unsaturation degree.

The oxyalkylene polymer is essentially a polymer having the repeating units represented by the general formula (9):

$$-R^6-O- \quad (9)$$

wherein $R^6$ is a divalent organic group, and a straight chain or branched alkylene group having 1 to 14 carbon atoms. In the general formula (9), $R^6$ is preferably a straight chain or branched alkylene group having 1 to 14 carbon atoms, and more preferably 2 to 4 carbon atoms. Specific examples of the repeating units represented by the general formula (9) may include:

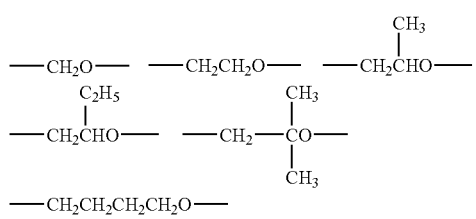

The main chain skeleton of the polyoxyalkylene polymer may be formed of either only one type of repeating unit or two or more types of repeating units. In particular, in the case where the polymer is used for a sealant and the like, it is preferable that the main chain skeleton is formed of a polymer containing as the main component a propyleneoxide polymer because a polymer having such a main chain skeleton is amorphous and relatively low in viscosity.

For the purpose of facilitating the reactions with the polyisocyanate compound (E) and the hydrolyzable silicon group-containing isocyanate compound (G), preferable is an oxyalkylene polymer in which ethylene oxide is copolymerized so as for the terminal hydroxy groups to be primary ones.

Examples of the polyacryl polyol may include a polyol which has the skeleton formed of an alkyl (meth)acrylate (co)polymer and additionally has hydroxy groups in the molecule thereof. The synthesis method of this polymer is preferably the living radical polymerization method because this method can lead to narrow molecular weight distributions and low viscosities, and the atom transfer radical polymerization method is further preferable. Additionally, it is preferable to use a polymer based on the so-called SGO process which is obtained by continuous block polymerization of an alkyl acrylate monomer at a high temperature and under a high pressure, as described in Japanese Patent Laid-Open No. 2001-207157. Specific examples of such a polymer may include UH-2000 manufactured by Toagosei Co., Ltd.

Examples of the polyester polyol may include, for example, polymers obtained by polycondensation of dicarboxylic acids such as maleic acid, fumaric acid, adipic acid, sebacic acid and phthalic acid with the diols; ring-opening polymers produced from ε-caprolactone, valerolactone and the like; and active hydrogen compounds each having 2 or more active hydrogen atoms such as castor oil.

Examples of the saturated hydrocarbon polymers having hydroxy groups at the terminals thereof may include, for example, polyols having the skeletons including ethylene/α-olefin, polyisobutylene, hydrogenated polyisoprene or hydrogenated polybutadiene.

Examples of the polythiol compound may include liquid polysulfides represented by the general formula, HS—(R—SS)$_l$—R—SH, wherein R is —$C_2H_4$—, —$C_3H_6$—, —$C_2H_4$—O—$C_2H_4$—, —$C_2H_4$—O—$CH_2$—O—$C_2H_4$—, —$C_3H_6$—O—$C_3H_6$—O—$C_3H_6$— or —$C_2H_4$—O—($C_2H_4$—O)$_m$—$C_2H_4$—; and l and m each represent an integer of 2 to 50. Specific examples of such a compound may include LP-282 and LP-55 manufactured by Toray Thiocoal Co., Ltd.

Examples of the polyamine compound may include primary amino group-containing oligomers such as Jeffamine D-400, D-2000, D-4000, D-403, T-3000 and T-5000 manufactured by Mitsui Fine Chemicals, Inc., acrylonitrile-butadiene copolymer rubber having primary amino groups at both terminals thereof such as ATMN 1300X16 manufactured by Ube Industries, Ltd.; and secondary amino group-containing polymers.

For the purpose of attaining a high molecular weight by the reaction with the polyisocyanate compound (E) and also for the purpose of increasing the introduction ratio of the silyl group by the reaction with the hydrolyzable silicon group-containing isocyanate group (G), the number of the active hydrogen-containing groups in the organic polymer (D) is preferably at least 1.2 or more, more preferably 1.6 or more, and particularly preferably 1.8 to 4, per one molecule on average over all the molecules. Among these, it is preferably 1.8 to 3, for the purpose of preventing gelation at the time of reaction with the polyisocyanate compound (E).

An oxyalkylene polymer for which the number of hydroxy groups is 2 or more can be produced by replacing a part or the whole of the bifunctional initiators with a trifunctional or higher functional initiator; mixing the obtained bifunctional or higher functional oxyalkylene polymer with a bifunctional or lower functional oxyalkylene polymer makes it possible to obtain an oxyalkylene polymer having 1.2 to 4 hydroxy groups per one molecule on average over all the molecules.

With respect to the number average molecular weight of the organic polymer (D) having active hydrogen-containing groups at the terminals thereof, the organic polymer (D) having a number average molecular weight of 1000 or more as measured by GPC relative to polystyrene standards can be used. When the number average molecular weight of the organic polymer (D) is small, the number of the amide segments introduced into the organic polymer (A) to be obtained comes to be large, the viscosity comes to be relatively high, and hence the number average molecular weight of the organic polymer (D) is preferably 2000 or more, and particularly preferably 4000 or more.

As the polyisocyanate compound (E), any polyisocyanate compounds can be used.

The number of the isocyanate groups contained in the polyisocyanate compound (E) is preferably 2 to 5 per one molecule on average, and more preferably 2 to 3 from the viewpoint of easy availability. Furthermore, because no gelation is caused when reacting with the organic polymer (D) having active hydrogen-containing groups at the terminals thereof, the number of the isocyanate groups concerned is most preferably 2.

Specific examples of the polyisocyanate compound may include: aromatic monomers such as tolylene diisocyanate (TDI), 4,4-diphenylmethane diisocyanate (MDI), polymeric MDI, xylylene diisocyanate (XDI), naphthylene diisocyanate (NDI), tolydine diisocyanate (TODI), p-phenylene diisocyanate (PPDI), triphenylmethane triisocyanate, tris(isocyanate phenyl) thiophosphate, tetramethylxylylene diisocyanate (TMXDI); and aliphatic monomers such as hexamethylene diisocyanate (HDI), isophorone diisocyanate (IPDI), dicyclohexylmethane diisocyanate (hydrogenated MDI), 1,3-bis (isocyanatomethyl)cyclohexane (hydrogenated XDI), lysine diisocyanate (LDI), isopropylidene bis(4-cyclohexyl isocyanate), cyclohexyl diisocyanate (CHDI), 1,6,11-undecane triisocyanate, 1,3,6-hexamethylene triisocyanate, bicycloheptane triisocyanate, and trimethylhexamethylene diisocyanate. Dimmers, trimers, uretodione derivatives, isocyanurate derivatives, cyanurate derivatives, carbodiimide derivatives, and alohanate-, biuret- and urea-modified compounds of these compounds can also be used.

More preferable among the polyisocyanate compounds (E) are those compounds in which all the isocyanate groups in the molecules thereof are not directly bonded to any of aromatic rings and carbon-carbon unsaturated bonds because cured articles using the organic polymers (A) obtained with these compounds attain satisfactory weather resistance. No particular constraint is imposed on such polyisocyanate compounds as log as such compounds do not contain any of the structures, aromatic ring carbon-N=C=O, —C=C—N=C=O and —C≡C—N=C=O. Specific examples of such compounds may include aliphatic monomers such as hexamethylene diisocyanate (HDI), isophorone diisocyanate (IPDI), dicyclohexylmethane diisocyanate (hydrogenated MDI), and 1,3-bis(isocyanatomethyl)cyclohexane (hydrogenated XDI); and xylylene diisocyanate (XDI). Additionally, various types of derivatives of these compounds may be included.

No particular constraint is imposed on the silicon compound (F); however, specific examples thereof may include: amino group-containing silanes such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropylmethyldimethoxysilane, γ-(N-phenyl)aminopropyltrimethoxysilane, N-ethylaminoisobutyltrimethoxysilane, aminomethyltrimethoxysilane, N-methylaminomethyltrimethoxysilane, N-cyclohexylaminomethyltrimethoxysilane and N-phenylaminomethyltrimethoxysilane; hydroxy group-containing silanes such as γ-hydroxypropyltrimethoxysilane and hydroxymethyltrimethoxysilane; and mercapto group-containing silanes such as γ-mercaptopropyltrimethoxysilane and mercaptomethyltrimethoxysilane. Additionally, as described in Japanese Patent Laid-Open Nos. 6-211879 (U.S. Pat. No. 5,364,955), 10-53637 (U.S. Pat. No. 5,756,751), 10-204144 (EP0831108), 2000-169544 and 2000-169545, Michael addition reaction products between various types of α,β-unsaturated carbonyl compounds and primary amino group-containing silanes, or Michael addition reaction products between various types of (meth)acryloyl group-containing silanes and primary amino group-containing compounds can also be used as the silicon compound (F).

No particular constraint is imposed on the silicon group-containing isocyanate compound (G); however, specific examples thereof may include: γ-trimethoxysilylpropyl isocyanate, γ-triethoxysilylpropyl isocyanate, γ-methyldimethoxysilylpropyl isocyanate and γ-methyldiethoxysilylpropyl isocyanate. As described in Japanese Patent Laid-Open No. 2000-119365 (U.S. Pat. No. 6,046,270), silicon group-containing isocyanate compounds obtained by reacting the silicon compounds (F) with excessive amounts of the polyisocyanate compounds (E) can also be used as the component (G).

Catalysts can be used for the reaction between the active hydrogen-containing groups in the organic polymer (D) and an isocyanate group and the reaction between the W group in the silicon compound (F) and an isocyanate group; however, when the storage stability of the organic polymer (A) to be obtained is degraded, these reactions are preferably carried out in the absence of these catalysts. When a catalyst is used, catalysts well known in the art may be used as long as such catalysts catalyze the reaction between a hydroxy group and an isocyanate group.

The organic polymer (A) may be a straight chain or may have branches, and the number average molecular weight thereof, as measured by GPC relative to polystyrene standards, is preferably of the order of 500 to 50,000, and more preferably 1,000 to 30,000. When the number average molecular weight is less than 500, there is found an adverse trend involving the elongation properties of the cured article, while when the number average molecular weight exceeds 50000, there is found an adverse trend involving the workability because the viscosity is high.

The organic polymers (A) may be used each alone or in combinations of two or more thereof.

In the present invention, as the component (B), a metal carboxylate (B1) and/or a carboxylic acid (B2) is used. The component (B) functions as a so-called silanol condensation catalyst capable of forming siloxane bonds from the hydroxy groups or the hydrolyzable groups, each bonded to a silicon atom, contained in the organic polymer as the component (A).

The component (B) displays a practical curability and can increase the heat resistance of the obtained cured article as compared to the other silanol condensation catalysts such as organotin catalysts although the component (B) is a non-organotin catalyst.

No particular constraint is imposed on the metal carboxylates and/or the carboxylic acid to be used in the present invention, and various types of compounds can be used.

As the metal carboxylate (B1), because of high catalytic activity, preferable are tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates and cerium carboxylates; more preferable are tin carboxylates, lead carboxylates, bismuth carboxylates, titanium carboxylates, iron carboxylates and zirconium carboxylates; and particularly preferable are tin carboxylates and most preferable are divalent tin carboxylates.

As the carboxylic acids having the acid radicals of the metal carboxylates, preferably used are compounds containing hydrocarbon based carboxylic acid radicals each having 2 to 40 carbon atoms inclusive of the carbonyl carbon atom(s); because of availability, hydrocarbon carboxylic acids having 2 to 20 carbon atoms are particularly preferably used.

Specific examples may include: straight chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid and lacceric acid; monoene unsaturated fatty acids such as undecylenic acid, linderic acid, tsuzuic acid, physeteric acid, myristoleic acid, 2-hexadecenic acid, 6-hexadecenic acid, 7-hexadecenic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid and 10-undecenoic acid; polyene unsaturated fatty acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nishinic acid and docosahexaenoic acid; branched fatty acids such as 1-methylbutyric acid, isobutyric acid, 2-ethylbutyric acid, isovaleric acid, tuberculostearic acid, pivalic acid and neodecanoic acid; fatty acids having a triple bond such as propiolic acid, tariric acid, stearolic acid, crepenynic acid, ximenynic acid and 7-hexadecynoic acid; alicyclic carboxylic acids such as naphthenic acid, malvalic acid, sterculic acid, hydnocarbic acid, chaulmoogric acid and gorlic acid; oxygen-containing fatty acids such as acetoacetic acid, ethoxy acetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid and cerebronic acid; and halogen-substituted monocarboxylic acids such as chloroacetic acid, 2-chloroacrylic acid and chlorobenzoic acid. Examples of fatty dicarboxylic acids may include saturated dicarboxylic acids such as adipic acid, azelaic acid, pimelic acid, superic acid, sebacic acid, ethylmalonic acid, glutaric acid, oxalic acid, malonic acid, succinic acid and oxydiacetic acid; and unsaturated dicarboxylic acids such as maleic acid, fumaric acid, acetylenedicarboxylic acid and itaconic acid. Examples of fatty polycarboxylic acids may include tricarboxylic acids such as aconitic acid, citric acid and isocitric acid. Examples of aromatic carboxylic acids may include aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid and pyromellitic acid. Additional other examples may include amino acids such as alanine, leucine, threonine, aspartic acid, glutamic acid, arginine, cysteine, methionine, phenylalanine, tryptophane and histidine.

The carboxylic acid is preferably 2-ethylhexanoic acid, octylic acid, neodecanoic acid, oleic acid, naphthenic acid or the like, because particularly these acids are easily available and low in price, and satisfactorily compatible with the component (A).

When the melting point of the carboxylic acid is high (the crystallinity is high), the metal carboxylate having the acid radical of the carboxylic acid concerned has similarly a high melting point and is hardly handlable (poor in workability). Accordingly, the melting point of the carboxylic acid is preferably 65° C. or less, more preferably −50 to 50° C, and particularly preferably −40 to 35° C.

Additionally, when the number of the carbon atoms in the carboxylic acid is large (the molecular weight thereof is large), the metal carboxylate having the acid radical of the carboxylic acid takes a solid form or a highly viscous liquid form to be hardly handlable (poor in workability). On the contrary, when the number of the carbon atoms in the carboxylic acid is small (the molecular weight thereof is small), sometimes tin carboxylate having the acid radical contains such components that are easily evaporated by heating, and the catalytic activity of the metal carboxylate is degraded. Particularly, under the conditions that the composition is extended thinly (under the conditions of a thin layer), sometimes the evaporation due to heating is significant, and the catalytic activity of the metal carboxylate is largely degraded. Accordingly, for the carboxylic acid, the number of the carbon atoms inclusive of the carbonyl carbon atom(s) is preferably 2 to 20, more preferably 6 to 17, and particularly preferably 8 to 12.

From the viewpoint of easy handlability (workability and viscosity) of the metal carboxylate, the metal carboxylate is preferably a metal dicarboxylate or a metal monocarboxylate, and more preferably a metal monocarboxylate.

Additionally, the metal carboxylate is preferably a metal carboxylate in which the carbon atom adjacent to the carbonyl group is a tertiary carbon atom (tin 2-ethylhexanoate and the like) or a metal carboxylate in which the carbon atom adjacent to the carbonyl group is a quaternary carbon atom (tin neodecanoate, tin pivalate and the like) because of rapid curing rate, and is particularly preferably a metal carboxylate in which the carbon atom adjacent to the carbonyl group is a quaternary carbon atom. The metal carboxylate in which the carbon atom adjacent to the carbonyl group is a quaternary carbon atom leads to a better adhesion as compared to other metal carboxylates.

Examples of the carboxylic acid having the acid radical of the metal carboxylate in which the carbon atom adjacent to the carbonyl group is a quaternary carbon atom may include linear fatty acids represented by the general formula (10):

(10)

wherein $R^7$, $R^8$ and $R^9$ each are independently a substituted or unsubstituted monovalent hydrocarbon group, and may include carboxyl groups; and cyclic fatty acids having a structure represented by the general formula (11):

(11)

wherein $R^{10}$ is a substituted or unsubstituted monovalent hydrocarbon group, $R^{11}$ is a substituted or unsubstituted divalent hydrocarbon group, and $R^{10}$ and $R^{11}$ each may include carboxyl groups, and having a structure represented by the general formula (12):

(12)

wherein $R^{12}$ is a substituted or unsubstituted trivalent hydrocarbon group, and may include carboxyl groups. Specific examples may include: linear monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, 2,2-dimethyl-3-hydroxypropionic acid; linear dicarboxylic acids such as dimetylmalonic acid, ethylmethylmalonic acid, diethylmalonic acid, 2,2-dimethylsuccinic acid, 2,2-diethylsuccinic acid and 2,2-dimethylglutaric acid; linear tricarboxylic acids such as 3-methylisocitric acid and 4,4-dimethylaconitic acid; cyclic carboxylic acids such as 1-methylcyclopentane carboxylic acid, 1,2,2-trimethyl-1,3-cyclopentane dicarboxylic acid, 1-methylcyclohexane carboxylic acid, 2-methylbicyclo [2.2.1]-5-heptene-2-carboxylic acid, 2-methyl-7-oxabicyclo [2.2.1]-5-heptene-2-carboxylic acid, 1-adamantane carboxylic acid, bicyclo[2.2.1]heptane-1-carboxylic acid and bicyclo [2.2.2]octane-1-carboxylic acid. Compounds having such structures are abundant in natural products, and such compounds can certainly be used.

Particularly, metal salts of monocarboxylic acids are more preferable because these metal salts are satisfactory in the compatibility with the component (A) and easy in handling;

additionally, metal salts of linear monocarboxylic acids are more preferable. Additionally, because of easy availability, metal salts of pivalic acid, neodecanoic acid, versatic acid, 2,2-dimethyloctanoic acid, 2-ethyl-2,5-dimethylhexanoic acid and the like are particularly preferable.

The number of the carbon atoms in such a carboxylic acid having the acid radical of a metal carboxylate in which the carbon atom adjacent to the carbonyl group is a quaternary carbon atom is preferably 5 to 20, more preferably 6 to 17, and particularly preferably 8 to 12. When the number of the carbon atoms exceeds these ranges, the metal carboxylate tends to take a solid form, becomes hardly compatible with the component (A), and tends to hardly exhibit activity. On the other hand, when the number of the carbon atoms is small, the carboxylic acids tends to be easily evaporated and tends to display strong odor. From the viewpoints of these issues, metal slats of neodecanoic acid, versatic acid, 2,2-dimethyloctanoic acid and 2-ethyl-2,5-dimethylhexanoic acid are most preferable.

The use of such metal carboxylates as the component (B1) of the present invention provides cured articles having satisfactory heat resistance, recovery properties, durability and creep resistance. Also provided are cured articles satisfactory in water-resistant adhesion, adhesion durability under conditions of high temperatures and high humidities, residual tack, dust sticking property, staining property, surface weather resistance, heat resistance and adhesion to concrete.

The used amount of the component (B1) is preferably of the order of 0.01 to 20 parts by weight, and more preferably of the order of 0.5 to 10 parts by weight in relation to 100 parts by weight of the component (A). When the blended amount of the component (B1) is less than these ranges, sometimes the curing rate becomes slow, and the curing reaction tends to hardly proceed to a sufficient extent. On the other hand, when the blended amount of the component (B1) exceeds these ranges, the work life tends to be too short and the workability thereby tends to be degraded, and the storage stability also tends to be degraded.

The metal carboxylates as the component (B1) may be used each alone, and additionally, may be used in combinations of two or more thereof.

In the present invention, carboxylic acids can be used as the component (B2). The heat resistance of the cured article obtained by use of a carboxylic acid as a catalyst is preferably better than the heat resistance of the cured article obtained by use of a metal carboxylate (B1).

The component (B2) may be used alone as a curing catalyst, but the use thereof in combination with the component (B1) displays an advantageous effect of improving the curing activity of the curable composition of the present invention. When a metal carboxylate as the component (B1) is used as a curing catalyst, sometimes the curability is degraded after storage; however, the use of the component (B2) added in combination with the component (B1) can suppress the degradation of the curability after storage.

Examples of the carboxylic acid as the component (B2) may include the above described various types of carboxylic acids each having the acid radical of a metal carboxylate as the component (B1). Additionally, those carboxylic acid derivatives which can produce the above described carboxylic acids by hydrolysis, namely, the derivatives such as carboxylic acid anhydrides, esters, acyl halides, nitriles and amides, can also be used as the component (B2).

The number of the carbon atoms, inclusive of the carbonyl carbon atom(s), of a carboxylic acid as the component (B2) is preferably 2 to 20, more preferably 6 to 17, and particularly preferably 8 to 12, similarly to the carboxylic acids each having the acid radical of a metal carboxylate as the component (B1). From the viewpoint of easy handlability (workability and viscosity) of the carboxylic acid, the carboxylic acid is preferably a dicarboxylic acid or a monocarboxylic acid, and more preferably a monocarboxylic acid. Additionally, the carboxylic acid is preferably a carboxylic acid in which the carbon atom adjacent to the carbonyl group is a tertiary carbon atom (2-ethylhexanoic acid and the like) or a carboxylic acid in which the carbon atom adjacent to the carbonyl group is a quaternary carbon atom (neodecanoic acid, pivalic acid and the like) because of rapid curing rate, and is particularly preferably a carboxylic acid in which the carbon atom adjacent to the carbonyl group is a quaternary carbon atom.

From the viewpoints of the availability, curability and workability, as the carboxylic acids, 2-ethylhexanoic acid, neodecanoic acid, versatic acid, 2,2-dimethyloctanoic acid and 2-ethyl-2,5-dimethylhexanoic acid are particularly preferable.

The use of the carboxylic acid as the component (B2) provides curable compositions giving cured articles having satisfactory heat resistance, recovery properties, durability and creep resistance. Also provided are cured articles satisfactory in water-resistant adhesion, adhesion durability under conditions of high temperatures and high humidities, residual tack, dust sticking property, staining property, surface weather resistance, heat resistance, adhesion to concrete and the like.

The used amount of the component (B2) is preferably of the order of 0.01 to 20 parts by weight, and further preferably of the order of 0.5 to 10 parts by weight in relation to 100 parts by weight of the component (A). When the blended amount of the component (B2) is less than these ranges, sometimes the curing rate tends to become slow. On the other hand, when the blended amount of the component (B2) exceeds these ranges, the work life tends to be too short and the workability thereby tends to be degraded, and the viscosity also tends to be increased.

The carboxylic acids as the component (B2) may be used each alone, and additionally may be used in combinations of two or more thereof.

The component (B1) and the component (B2) may be used each alone or in combination.

In this connection, when only with the component (B), activity is low and hence no appropriate curability is obtained, an amine compound may be added as the component (C).

Specific examples of the amine compound as the component(C) may include: aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine and butylstearylamine; aliphatic tertiary amines such as triamylamine, trihexylamine and trioctylamine; aliphatic unsaturated amines such as triallylamine and oleylamine; aromatic amines such as laurylaniline, stearylaniline and triphenylamine; and other amines such as benzylamine, monoethanolamine, diethanolamine, triethanolamine, 3-hydroxypropylamine, ethylenediamine, N,N-diethylethylenediamine, xylylenediamine, diethylenetriamine, triethylenetetramine, 3-methoxypropylamine, 3-lauryloxypropylamine, N-methyl-1,3-propanediamine, 3-dimethylaminopropylamine, 3-diethylaminopropylamine, 3-(1-piperazinyl)propylamine, 3-morphorinopropylamine, 2-(1-piperazinyl)ethylamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU) and 1,5-diazabicyclo(4,3,0)nonene-5 (DBN). However, the amine compound as the component (C) is not limited to these examples.

Because the cocatalytic activity of the component (C) is largely varied depending on the structure of the component (C) itself and the compatibility thereof with the component (A), it is preferable that an appropriate compound is selected as the component (C) in conformity with the type of the component (A) to be used. When a polyoxyalkylene polymer, for example, is used as the component (A), primary amines such as octylamine and laurylamine are preferable because these amines are high in cocatalytic activity; additionally, preferable are the amine compounds each having a hydrocarbon group having at least one hetero atom. Examples of the hetero atom as referred to here may include N, O and S atoms, but the hetero atom is not limited to these examples. Examples of such amine compounds may include the amines described above under the category of other amines. Among such amines, more preferable are the amine compounds each having a hydrocarbon group having a hetero atom at the carbon atom at position 2, 3 or 4, and furthermore preferable are the amine compounds each having a hydrocarbon group having a hetero atom at the carbon atom at position 3. Examples of such amine compounds may include 3-hydroxypropylamine, 3-methoxypropylamine, 3-ethoxypropylamine, 3-lauryloxypropylamine, N-methyl-1,3-propanediamine, 3-dimethylaminopropylamine, 3-diethylaminopropylamine, 3-(1-piperazinyl)propylamine and 3-morpholinopropylamine. Among these, 3-diethylaminopropylamine and 3-morpholinopropylamine are more preferable because of high cocatalytic activity; 3-diethylaminopropylamine is particularly preferable because this compound gives curable compositions satisfactory in adhesion, storage stability and workability. Additionally, when an isobutylene polymer is used as the component (A), relatively long chain aliphatic secondary amines such as dioctylamine and distearylamine and aliphatic secondary amines such as dicyclohexylamine are preferable because of high cocatalytic activity.

The blended amount of the amine compound as the component (C) is preferably of the order of 0.01 to 20 parts by weight and more preferably 0.1 to 5 parts by weight in relation to 100 parts by weight of the organic polymer as the component (A). When the blended amount of the amine compound is less than 0.01 part by weight, sometimes the curing rate becomes slow, and the curing reaction hardly proceeds to a sufficient extent. On the other hand, when the blended amount of the amine compound exceeds 20 parts by weight, sometimes the pot life tends to be too short, and sometimes the curing rate becomes slow in reverse.

To the composition of the present invention, a (meth)acrylate polymer having reactive silicon groups may be added. The addition of the (meth)acrylate polymer improves the adhesion, weather resistance and chemical resistance of the composition of the present invention. No particular constraint is imposed on the (meth)acrylate monomers constituting the main chain of the above described (meth)acrylate polymer, and various types can be used. Examples of the monomers concerned may include (meth)acrylic acid based monomers such as (meth)acrylic acid, methyl(meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl(meth)acrylate, stearyl (meth)acrylate, glycidyl(meth)acrylate, 2-aminoethyl (meth)acrylate, γ-(methacryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate. The above described (meth)acrylate monomers can also be copolymerized with the following vinyl monomers. Examples of the vinyl monomers concerned may include styrene monomers such as styrene, vinyltoluene, α-methylstyrene, chlorstyrene, and styrenesulfonic acid and the salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic acid anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allylalcohol. These monomers may be used each alone or two or more of these monomers may be copolymerized. Among these, from the viewpoint of the physical properties and the like of the products, polymers formed of styrene monomers and (meth)acrylic acid monomers are preferable. More preferable are the (meth)acrylic polymers formed of acrylate monomers and methacrylate monomers, and particularly preferable are the acrylic polymers formed of acrylate monomers.

Examples of the manufacturing method of a reactive silicon group-containing (meth)acrylate polymer may include, for example, a manufacturing method in which the polymer concerned is obtained by using reactive silicon group-containing monomers such as vinyltrimethoxysilane, vinyltriethoxysilane, γ-methacryloyloxypropylmethyldimethoxysilane, γ-acryloyloxypropyltrimethoxysilane and the above described individual monomers, and by applying a common free radical polymerization method with a polymerization initiator such as an azo compound or a peroxide; the free radical polymerization methods with chain transfer agents as disclosed in Japanese Patent Publication Nos. 3-14068 and 4-55444, Japanese Patent Laid-Open No. 6-211922 and the like; and the atom transfer radical polymerization method as disclosed in Japanese Patent Laid-Open No. 9-272714 and the like. However, the manufacturing method concerned is not limited particularly to these methods.

The used amount of the reactive silicon group-containing (meth)acrylate polymer is preferably of the order of 1 to 500 parts by weight, and more preferably 10 to 100 parts by weight, in relation to 100 parts by weight of the organic polymer as the component (A). When the blended amount of the (meth)acrylate polymer is less than 1 part by weight, sometimes the improvement effects of the adhesion, weather resistance and chemical resistance are small, while when the blended amount of the (meth)acrylate polymer exceeds 50 parts by weight, som etimes the elongation of the obtained cured article is small.

To the composition of the present invention, a silicate may be added. The silicate functions as a cross-linking agent, and has functions to improve the recovery properties, durability and creep resistance of the organic polymer as the component (A) of the present invention. The silicate further has effects to improve the adhesion, water-resistant adhesion and adhesion durability under conditions of high temperatures and high humidities. As the silicate, tetraalkoxysilane, alkylalkoxysilane, or the partially hydrolyzed condensates thereof may be used.

Specific examples of the silicate may include, for example, tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane; and the partially hydrolyzed condensates thereof.

The partially hydrolyzed condensates of the tetraalkoxysilanes are more preferable because these condensates have larger improvement effects of the recovery properties, durability and creep resistance in the present invention than the tetraalkoxysilanes.

Examples of the partially hydrolyzed condensates of the tetraalkoxysilanes may include products obtained by condensation through partial hydrolysis of the tetraalkoxysilanes by adding water to the tetraalkoxysilanes according to common methods. As partially hydrolyzed condensates of organosilicate compounds, commercially available products may be used. Examples of such condensates may include Methyl Silicate 51 and Ethyl Silicate 40 (manufactured by Colcoat Co., Ltd.).

The used amount of the silicate is preferably of the order of 0.01 to 20 parts by weight, and more preferably 0.1 to 5 parts by weight in relation to 100 parts by weight of the organic polymer as the component (A). When the blended amount of the silicate is less than 0.01 part by weight, sometimes the improvement effects of the recovery properties, durability and creep resistance are small, while when the blended amount of the silicate exceeds 20 parts by weight, sometimes the elongation of the obtained cured article is small.

To the composition of the present invention, a filler may be added. Examples of the filler may include: reinforcing fillers such as fumed silica, precipitated silica, crystalline silica, fused silica, dolomite, anhydrous silicic acid, hydrous silicic acid and carbon black; fillers such as ground calcium carbonate, precipitated calcium carbonate, magnesium carbonate, diatomite, sintered clay, clay, talc, titanium oxide, bentonite, organic bentonite, ferric oxide, aluminum fine powder, flint powder, zinc oxide, active zinc white, shirasu balloon, glass microballoon, organic microballoons of phenolic resin and vinylidene chloride resin, and resin powders such as PVC powder and PMMA powder; and fibrous fillers such as asbestos, glass fiber and glass filament. When a filler is used, the used amount thereof is 1 to 250 parts by weight, and preferably 10 to 200 parts by weight in relation to 100 parts by weight of the organic polymer as the component (A).

When it is desired to obtain a cured article high in strength by use of these fillers, preferable is a filler mainly selected from fumed silica, precipitated silica, crystalline silica, fused silica, dolomite, anhydrous silicic acid, hydrous silicic acid, carbon black, surface treated fine calcium carbonate, sintered clay, clay, active zinc white and the like; a desirable effect is obtained when such a filler is used within a range from 1 to 200 parts by weight in relation to 100 parts by weight of the reactive silicon group-containing organic polymer (A). Also, when it is desired to obtain a cured article low in tensile strength and large in elongation at break, a desirable effect is obtained by use of a filler mainly selected from titanium oxide, calcium carbonate such as ground calcium carbonate, magnesium carbonate, talc, ferric oxide, zinc oxide, shirasu balloon and the like within a range from 5 to 200 parts by weight in relation to 100 parts by weight of the reactive silicon group-containing organic polymer (A). It is to be noted that in general, calcium carbonate exhibits, with increasing specific surface area value thereof, an increasing improvement effect of the tensile strength at break, elongation at break and adhesion of the cured article. Needless to say, these fillers may be used each alone or in admixtures of two or more thereof. When calcium carbonate is used, it is desirable to use surface treated fine calcium carbonate in combination with calcium carbonate larger in particle size such as ground calcium carbonate. The particle size of surface treated fine calcium carbonate is preferably 0.5 µm or less, and the surface treatment is preferably carried out by treating with a fatty acid or a fatty acid salt. A calcium carbonate larger in particle size is preferably 1 µm or more in particle size, and can be used without being subjected to surface treatment.

For the purpose of improving the workability (unstickiness and the like) of the composition and matting the surface of the cured article, organic balloons and inorganic balloons are preferably added. Such fillers can be subjected to surface treatment, and may be used each alone or in admixtures of two or more thereof. For the purpose of improving the workability (unstickiness and the like), the particle sizes of these balloons are preferably 0.1 mm or less. For the purpose of matting the surface of the cured article, the particle sizes are preferably 5 to 300 µm.

On the grounds that the cured article of the composition of the present invention is satisfactory in weather resistance and the like, the composition of present invention is suitably used for joints of housing exterior wall such as sizing boards, in particular, ceramic sizing boards, for an adhesive for exterior wall tiles, for an adhesive for exterior wall tiles remaining in the joints and for the like purposes; in this connection, it is desirable that the design of the exterior wall and the design of the sealant are in harmony with each other. Particularly, posh exterior walls have come to be used by virtue of sputter coating and mixing colored aggregates. When the composition of the present invention is blended with a scale-like or granular material having a diameter of 0.1 mm or more, preferably of the order of 0.1 to 5.0 mm, the cured article comes to be in harmony with such posh exterior walls, and is excellent in chemical resistance, so that the composition concerned comes to be an excellent composition in the sense that the exterior appearance of the cured article remains unchanged over a long period of time. Use of a granular material provides a dispersed sand-like or sandstone-like surface with a rough texture, while use of a scale-like material provides an irregular surface based on the scale-like shape of the material.

The preferable diameter, blended amount and materials for the scale-like or granular material are described in Japanese Patent Laid-Open No. 9-53063 as follows.

The diameter is 0.1 mm or more, preferably of the order of 0.1 to 5.0 mm, and there is used a material having an appropriate size in conformity with the material quality and pattern of exterior wall. Materials having a diameter of the order of 0.2 mm to 5.0 mm and materials having a diameter of the order of 0.5 mm to 5.0 mm can also be used. In the case of a scale-like material, the thickness is set to be as thin as the order of 1/10 to 1/5 the diameter (the order of 0.01 to 1.00 mm). The scale-like or granular material is transported to the construction site as a sealant in a condition that the material is beforehand mixed in the main part of the sealant, or is mixed in the main part of the sealant at the construction site when the sealant is used.

The scale-like or granular material is blended in a content of the order of 1 to 200 parts by weight in relation to 100 parts by weight of a composition such as a sealant composition and an adhesive composition. The blended amount is appropriately selected depending on the size of the scale-like or granular material, and the material quality and pattern of exterior wall.

As the scale-like or granular material, natural products such as silica sand and mica, synthetic rubbers, synthetic resins and inorganic substances such as alumina are used. The material is colored in an appropriate color so as to match the material quality and pattern of exterior wall for the purpose of heightening the design quality when filled in the joints.

A preferable finishing method and the like are described in Japanese Patent Laid-Open No. 9-53063.

When a balloon (preferably the mean particle size thereof is 0.1 mm or more) is also used for a similar purpose, the surface is formed to have a dispersed sand-like or sandstone-like surface with a rough texture, and a reduction of weight can be achieved. The preferable diameter, blended amount and materials for the balloon are described in Japanese Patent Laid-Open No. 10-251618 as follows.

The balloon is a spherical filler with a hollow interior. Examples of the material for such a balloon may include inorganic materials such as glass, shirasu and silica; and organic materials such as phenolic resin, urea resin, polystyrene and Saran™; however, the material concerned is not limited to these examples; an inorganic material and an organic material can be compounded, or can be laminated to form multiple layers. An inorganic balloon, an organic balloon, a balloon made of a compounded inorganic-organic material or the like can be used. Additionally, as a balloon to be used, either a single type of balloon or an admixture of multiple types of balloons can be used. Moreover, a balloon with the processed surface thereof or with the coated surface thereof can be used, and additionally, a balloon with the surface thereof subjected to treatment with various surface treatment agents can also be used. More specifically, there may be included examples in which an organic balloon is coated with calcium carbonate, talc, titanium oxide and the like, and an inorganic balloon is subjected to surface treatment with a silane coupling agent.

For the purpose of obtaining a dispersed sand-like or sandstone-like surface with a rough texture, the particle size of the balloon is preferably 0.1 mm or more. A balloon of a particle size of the order of 0.2 mm to 5.0 mm or a balloon of a particle size of the order of 0.5 mm to 5.0 mm can also be used. Use of a balloon of a particle size of less than 0.1 mm sometimes only increases the viscosity of the composition, and yields no rough texture even when the blended amount of the balloon is large. The blended amount of the balloon can be easily determined in conformity with the desired degree of the dispersed sand-like or sandstone-like rough texture. Usually, it is desirable that a balloon of 0.1 mm or more in particle size is blended in a ratio of 5 to 25 vol % in terms of the volume concentration in the composition. When the volume concentration of the balloon is less than 5 vol %, no rough texture can be obtained, while when the volume concentration of the balloon exceeds 25 vol %, the viscosity of the sealant and that of the adhesive tend to be high to degrade the workability, and the modulus of the cured article is high, so that the basic performance of the sealant and that of the adhesive tend to be impaired. The preferable volume concentration to balance with the basic performance of the sealant is 8 to 22 vol %.

When a balloon is used, there may be added an antislip agent described in Japanese Patent Laid-Open No. 2000-154368 and an amine compound to make irregular and matte the surface of the cured article described in Japanese Patent Laid-Open No. 2001-164237, in particular, a primary amine and/or a secondary amine having a melting point of 35° C. or higher.

Specific examples of the balloon are described in the following publications: Japanese Patent Laid-Open Nos. 2-129262, 4-8788, 4-173867, 5-1225, 7-113073, 9-53063, 10-251618, 2000-154368 and 2001-164237, and WO97/05201.

When the composition of the present invention includes the particles of the cured article derived from a sealant, the cured article can make irregularities on the surface thereof to improve the design quality. The preferable diameter, blended amount, materials and the like of the cured article particle material derived from a sealant are described in Japanese Patent Laid-Open No. 2001-115142 as follows. The diameter is preferably of the order of 0.1 mm to 1 mm, and further preferably of the order of 0.2 to 0.5 mm. The blended amount is preferably 5 to 100 wt %, and further preferably 20 to 50 wt % in the curable composition. Examples of the materials may include urethane resin, silicone, modified silicone and polysulfide rubber. No constraint is imposed on the materials as long as the materials can be used as sealants; however, modified silicone sealants are preferable.

To the composition of the present invention, a plasticizer may be added. Addition of a plasticizer makes it possible to adjust the viscosity and slump property of the curable composition and the mechanical properties such as tensile strength and elongation of the cured article obtained by curing the composition. Examples of the plasticizer may include phthalates such as dibutyl phthalate, diheptyl phthalate, di(2-ethylhexyl) phthalate and butyl benzyl phthalate; non-aroamtic dibasic acid esters such as dioctyl adipate, dioctyl sebacate, dibutyl sebacate and isodecyl succinate; aliphatic esters such as butyl oleate and methyl acetylricirinoleate; phosphates such as tricresyl phosphate and tributyl phosphate; alkyl sulfates; trimellitates; chlorinated paraffins; hydrocarbon oils such as alkyldiphenyls and partially hydrogenated terphenyls; process oils; and epoxy plasticizers such as epoxidized soybean oil and benzyl epoxystearate.

Additionally, a polymer plasticizer may be used. When a polymer plasticizer is used, the initial physical properties are maintained over a longer period of time than when a low molecular weight plasticizer which is a plasticizer containing no polymer component in the molecule thereof is used. Moreover, the drying property (also referred to as coating property) can be improved when an alkyd coating material is applied onto the cured article concerned. Specific examples of the polymer plasticizer may include: vinyl polymers obtained by polymerizing vinyl monomers by means of various methods; polyalkylene glycol esters such as diethylene glycol dibenzoate, triethylene glycol dibenzoate and pentaerythritol ester; polyester plasticizers. obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of 500 or more, additionally 1000 or more such as polyethylene glycol, polypropylene glycol and polytetramethylene glycol, and the derivatives of these polyether polyols in which the hydroxy groups in these polyether polyols are substituted with ester groups, ether groups and the like; polystyrenes such as polystyrene and poly-α-methylstyrene; and polybutadiene, polybutene, polyisobutylene, butadiene-acrylonitrile and polychloroprene. However, the polymer plasticizer concerned is not limited to these examples.

Among polymer plasticizers, those polymer plasticizers which are compatible with the organic polymer as the component (A) are preferable. In this regard, polyethers and vinyl polymers are preferable. Additionally, the use of polyethers as plasticizers improves the surface curability and deep part curability, and causes no curing retardation after storage, and hence polyethers are preferable; among polyethers, polypropylene glycol is more preferable. Additionally, from the viewpoint of the compatibility, weather resistance and heat resistance, vinyl polymers are preferable. Among the vinyl polymers, acrylic polymers and/or methacrylic polymers are preferable, and acrylic polymers such as polyalkylacrylate are further preferable. As the synthesis method of this polymer, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuous block polymerization of an alkyl acrylate monomer at a high temperature and under a high pressure, as described in Japanese Patent Laid-Open No. 2001-207157.

The number average molecular weight of the polymer plasticizer is preferably 500 to 15000, more preferably 800 to 10000, further preferably 1000 to 8000, particularly preferably 1000 to 5000, and most preferably 1000 to 3000. When the molecular weight is too low, the plasticizer is removed with time thermally and by rainfall, and hence it is made impossible to maintain the initial physical properties over a long period of time, and the coating property with the alkyd coating cannot be improved. On the other hand, when the molecular weight is too high, the viscosity is high and the workability is degraded. No particular constraint is imposed on the molecular weight distribution of the polymer plasticizer. However, it is preferable that the molecular weight distribution is narrow; the molecular weight distribution is preferably less than 1.80, more preferably 1.70 or less, further preferably 1.60 or less, yet further preferably 1.50 or less, particularly preferably 1.40 or less and most preferably 1.30 or less.

The number average molecular weight of a vinyl polymer is measured with the GPC method, and that of a polyether polymer is measured with the end group analysis method. Additionally, the molecular weight distribution (Mw/Mn) is measured with the GPC method (relative to polystyrene standards).

Additionally, the polymer plasticizer either may have no reactive silicon group or may have one or more reactive silicon groups. When the polymer plasticizer has one or more reactive silicon groups, the polymer plasticizer acts as a reactive plasticizer, and can prevent the migration of the plasticizer from the cured article. When the polymer plasticizer has one or more reactive silicon groups, the average number of the reactive silicon groups per one molecule is 1 or less, and preferably 0.8 or less. When the reactive silicon group-containing plasticizer, in particular, a reactive silicon group-containing oxyalkylene polymer is used, it is necessary that the number average molecular weight thereof be lower than that of the organic polymer as the component (A).

The plasticizers may be used each alone or in combinations of two or more thereof. Additionally, a low molecular weight plasticizer and a polymer plasticizer may be used in combination. It is to be noted that these plasticizers can also be blended when the organic polymer is produced.

The used amount of the plasticizer is 5 to 150 parts by weight, preferably 10 to 120 parts by weight, and further preferably 20 to 100 parts by weight, in relation to 100 parts by weight of the organic polymer as the component (A). When the used amount is less than 5 parts by weight, the effect as the plasticizer is not attained, while when the used amount exceeds 150 parts by weight, the mechanical strength of the cured article is insufficient.

To the composition of the present invention, a silane coupling agent, a reaction product of a silane coupling agent or a compound other than the silane coupling agent may be added as an adhesion-imparting agent. Specific examples of the silane coupling agent may include: isocyanate group-containing silanes such as γ-isocyanatepropyltrimethoxysilane, γ-isocyanatepropyltriethoxysilane, γ-isocyanatepropylmethyldiethoxysilane and γ-isocyanatepropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl-type unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; and isocyanurate silanes such as tris(trimethoxysilyl)isocyanurate. Additionally, the following derivatives obtained by modifying these compounds can be used as silane coupling agents: amino-modified silylpolymer, silylated aminopolymer, unsaturated aminosilane complex, phenylamino-long chain alkylsilane, aminosilylated silicone and silylated polyester. The silane coupling agents used in the present invention are usually used within a range from 0.1 to 20 parts by weight in relation to 100 parts by weight of the reactive silicon group-containing organic polymer (A). Particularly, it is preferable to use the silane coupling agents within a range from 0.5 to 10 parts by weight.

The effect of the silane coupling agent added to the curable composition of the present invention is such that the silane coupling agent exhibits marked adhesion improvement effect under either non-primer conditions or primer-treatment conditions when the silane coupling agent is applied to various types of adherends, namely, inorganic substrates made of the materials such as glass, aluminum, stainless steel, zinc, copper and mortar, and organic substrates made of the materials such as polyvinyl chloride, acrylic resin, polyester, polyethylene, polypropylene and polycarbonate. When the silane coupling agent is applied under non-primer conditions, improvement effect of adhesion to various adherends is particularly remarkable. No particular constraint is imposed on the adhesion-imparting agents other than the silane coupling agents, and specific examples of such adhesion-imparting agents may include, for example, epoxy resin, phenolic resin, sulfur, alkyl titanates and aromatic polyisocyanates. These adhesion-imparting agents may be used each alone or in admixtures of two or more thereof. Addition of these adhesion-imparting agents can improve the adhesion to adherends.

To the curable composition of the present invention, according to need, there may be added a physical property modifier to modify the tensile strength of the produced cured article. No particular constraint is imposed on the physical property modifier. However, examples of the physical property modifier may include, for example, alkylalkoxysilanes such as methyltrimethoxysilane, dimethyldimethoxysilane, trimethylmethoxysilane and n-propyltrimethoxysilane; alkoxysilanes having functional groups such as alkylisopropenoxysilanes including dimethyldiisopropenoxysilane, methyltriisopropenoxysilane, and γ-glycidoxypropylmethyldiisopropenoxysilane, and γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. The use of the physical property modifier makes it possible to increase the hardness obtained when the composition of the present invention is cured, or to decrease the hardness in reverse to display the elongation at break. The physical property modifiers may be used each alone or in combinations of two or more thereof.

It is to be noted that a compound to hydrolytically produce a compound having a monovalent silanol group in the molecule thereof has an effect to decrease the modulus of the cured article without degrading the stickiness of the surface of the cured article. Particularly, a compound to produce trimethylsilanol is preferable. Examples of the compound to hydrolytically produce a compound having a monovalent silanol group in the molecule thereof may include a compound described in Japanese Patent Laid-Open No. 5-117521. Additionally, examples of such a compound may include a compound which is a derivative of an alkyl alcohol such as hexanol, octanol or decanol, and produces a silicon compound to hydrolytically produce $R_3SiOH$ such as trimethylsilanol, a silicon compound described in Japanese Patent Laid-Open No. 11-241029, which is a derivative of a polyhydric alcohol having three or more hydroxy groups such as trimethylolpropane, glycerin, pentaerythritol or sorbitol, and hydrolytically produces $R_3SiOH$ such as trimethylsilanol.

Additionally, there may be cited such a compound as described in Japanese Patent Laid-Open No. 7-258534 which is a derivative of an oxypropylene polymer and produces a silicon compound to hydrolytically produce $R_3SiOH$ such as trimethylsilanol. Moreover, there may be used an organic polymer described in Japanese Patent Laid-Open No. 6-279693 which contains a hydrolyzable silicon-containing group capable of cross-linking and a silicon-containing group capable of hydrolytically forming a monosilanol-containing compound.

The physical property modifier is used within a range from 0.1 to 20 parts by weight, and preferably from 0.5 to 10 parts by weight, in relation to 100 parts by weight of the reactive silicon group-containing organic polymer (A).

To the curable composition of the present invention, according to need, a thixotropic agent (antisagging agent) may be added for the purpose of preventing sagging and improving workability. No particular constraint is imposed on the antisagging agent; however, examples of the antisagging agent may include, for example, polyamide waxes; hydrogenated castor oil derivatives; and metal soaps such as calcium stearate, aluminum stearate and barium stearate. These thixotropic agents (antisagging agents) may be used each alone or in combinations of two or more thereof. The thixotropic agents is used within a range. from 0.1 to 20 parts by weight in relation to 100 parts by weight of the reactive silicon group-containing organic polymer (A).

In the composition of the present invention, a compound which contains one or more epoxy groups in one molecule thereof may be used. Use of an epoxy group-containing compound can enhance the recovery properties of the cured article. Examples of the epoxy group-containing compound may include compounds such as epoxidized unsaturated oils and fats, epoxidized unsaturated fatty acid esters, alicyclic epoxy compounds and epichlorohydrin derivatives, and admixtures of these compounds. Specific examples may include epoxidized soybean oil, epoxidized flaxseed oil, di(2-ethylhexyl)-4,5-epoxycyclohexane-1,2-dicarboxylate (E-PS), epoxyoctyl stearate and epoxybutyl stearate. Among these, E-PS is particularly preferable. It is recommended that these epoxy group-containing compounds each are used within a range from 0.5 to 50 parts by weight in relation to 100 parts by weight of the reactive silicon group-containing organic polymer (A).

In the composition of the present invention, a photocuring substance may be used. Use of a photocuring substance forms a coating film of the photocuring substance on the surface of the cured article to improve the stickiness and the weather resistance of the cured article. A photocuring substance means a substance which undergoes a chemical change, caused by action of light, of the molecular structure thereof in a fairly short time to result in changes of the physical properties such as curing. Among such a large number of compounds known are organic monomers, oligomers, resins and compositions containing these substances, and any commercially available substances concerned may optionally be adopted. As representative photocuring substances, unsaturated acrylic compounds, polyvinyl cinnamates and azidized resins and the like may be used. The unsaturated acrylic compounds are monomers, oligomers and admixtures of the monomers and the oligomers, the monomers and oligomers each having one or a few acrylic or methacrylic unsaturated groups; examples of the unsaturated acrylic compounds may include monomers such as propylene (or butylene, or ethylene)glycol di(meth)acrylate and neopentylglycol di(meth)acrylate, and oligoesters of 10,000 or less in molecular weight related to these monomers. Specific examples may include special acrylates (bifunctional) such as Aronix M-210, Aronix M-215, Aronix M-220, Aronix M-233, Aronix M-240 and Aronix M-245; special acrylates (trifunctional) such as Aronix M-305, Aronix-309, Aronix M-310, Aronix M-315, Aronix M-320 and Aronix M-325; and special acrylates (multifunctional) such as Aronix M-400. Those compounds each having acrylic functional groups are particularly preferable, and additionally, those compounds each having, on average, three or more acrylic functional groups in one molecule thereof are preferable (all the aforementioned Aronix compounds are the products of Toagosei Co., Ltd.).

Examples of the polyvinyl cinnamates may include photosensitive resins having cinnamoyl groups as photosensitive groups, namely, those compounds obtained by esterification of polyvinyl alcohol with cinnamic acid; and additionally, a large number of derivatives of polyvinyl cinnamates. Azidized resins are known as photosensitive resins having azide groups as photosensitive groups; common examples of the azidized resins may include a rubber photosensitive solution added with a diazide compound as a photosensitive agent, and additionally, those compounds detailed in "Photosensitive Resins (Kankosei Jusi)" (published by Insatu Gakkai Shuppanbu, Mar. 17, 1972, p.93ff, p.106ff and p.117ff); and these compounds may be used each alone or in admixtures thereof, and in combination with sensitizers to be added according to need. It is to be noted that addition of sensitizers such as ketones and nitro compounds and accelerators such as amines sometimes enhances the effect. It is recommended that the photocuring substance is used within a range from 0.1 to 20 parts by weight and preferably from 0.5 to 10 parts by weight in relation to 100 parts by weight of the reactive silicon group-containing organic polymer (A); when the content of the photocuring substance is less than 0.1 part by weight, no effect to increase the weather resistance is displayed, while when the content exceeds 20 parts by weight, the cured article tends to be too hard and cracking thereby tends to occur therein.

In the composition of the present invention, an oxygen-curing substance may be used. Examples of the oxygen-curing substance may include unsaturated compounds reactable with the oxygen in the air, which react with the oxygen in the air and form a cured coating film in the vicinity of the surface of the cured article to act to prevent the surface stickiness and the sticking of dust and grime to the surface of the cured article and to do the like. Specific examples of the oxygen-curing substance may include: drying oils represented by wood oil, flaxseed oil and the like and various alkyd resins obtained by modifying these compounds; acrylic polymers, epoxy resins and silicon resins all modified with drying oils; liquid polymers such as 1,2-polybutadiene and 1,4-polybutadiene obtained by polymerizing or copolymerizing diene compounds such as butadiene, chloroprene, isoprene, 1,3-pentadiene, and polymers derived from dienes each having 5 to 8 carbon atoms, liquid copolymers such as NBR, SBR and the like obtained by copolymerizing these diene compounds with a minor proportion of monomers such as acrylonitrile, styrene and the like copolymerizable with these diene compounds, and various modified substances of these compounds (maleic modified substances, boiled-oil modified substances, and the like). These substances may be used each alone or in combinations of two or more thereof. Among these substances, wood oil and liquid diene polymers are particularly preferable. Additionally, in some cases, when catalysts to accelerate the oxidation curing reaction and metal dryers are used in combination with these substances, the effect is enhanced. Examples of these catalysts and metal dryers may include metal salts such as cobalt naphthenate, lead naphthenate, zirconium naphthenate, cobalt octylate and zirconium octylate; and amine compounds. The used amount of the oxygen-curing substance is recommended such that the oxygen-curing substance is used within a range from 0.1 to 20 parts by weight and further preferably from 0.5 to 10 parts by weight in relation to 100 parts by weight of the reactive silicon group-containing organic polymer (A); when the used amount is less than 0.1 part by weight, improvement of staining property is insufficient, while when the used amount exceeds 20 parts by weight, the tensile properties and the like of the cured article tend to be impaired. It is recommended that the oxygen-curing substance is used in combination with a photocuring substance as described in Japanese Patent Laid-Open No. 3-160053.

In the composition of the present invention, an antioxidant (antiaging agent) may be used. Use of an antioxidant can increase the heat resistance of the cured article. Examples of the antioxidant may include hindered phenol antioxidants, monophenol antioxidants, bisphenol antioxidants and polyphenol antioxidants, hindered phenol antioxidants being particularly preferable. Similarly, the following hindered amine photostabilizers may also be used: Tinuvin 622LD, Tinuvin 144; Chimassorb 944LD and Chimassorb 119FL (all manufactured by Ciba Specialty Chemicals K.K.); Mark LA-57, Mark LA-62, Mark LA-67, Mark LA-63 and Mark LA-68 (all manufactured by Asahi Denka Co., Ltd.); and Sanol LS-770, Sanol LS-765, Sanol LS-292, Sanol LS-2626, Sanol LS-1114 and Sanol LS-744 (all manufactured by Sankyo Lifetech Co., Ltd.). Specific examples of the antioxidants are also described in Japanese Patent Laid-Open Nos. 4-283259 and 9-194731. The used amount of the antioxidant is recommended such that the antioxidant is used within a range from 0.1 to 10 parts by weight and further preferably from 0.2 to 5 parts by weight in relation to 100 parts by weight of the reactive silicon group-containing organic polymer (A).

In the composition of the present invention, a photostabilizer may be used. Use of a photostabilizer can prevent the photooxidation degradation of the cured article. Examples of the photostabilizer may include benzotriazole compounds, hindered amine compounds and benzoate compounds; hindered amine compounds are particularly preferable. The used amount of the photostabilizer is recommended such that the photostabilizer is used within a range from 0.1 to 10 parts by weight and further preferably from 0.2 to 5 parts by weight in relation to 100 parts by weight of the reactive silicon group-containing organic polymer (A). Specific examples of the photostabilizer are also described in Japanese Patent Laid-Open No. 9-194731.

When the photocuring substance is used in combination in the composition of the present invention, in particular, when an unsaturated acrylic compound is used, it is preferable to use a tertiary amine-containing hindered amine photostabilizer as a hindered amine photostabilizer as described in Japanese Patent Laid-Open No. 5-70531 for the purpose of improving the storage stability of the composition. Examples of the tertiary amine-containing hindered amine photostabilizer may include Tinuvin 622LD, Tinuvin 144 and Chimassorb ll9FL (all manufactured by Ciba Specialty Chemicals K.K.); Mark LA-57, LA-62, LA-67 and LA-63 (all manufactured by Asahi Denka Co., Ltd.); and Sanol LS-765, LS-292, LS-2626, LS-1114 and LS-744 (all manufactured by Sankyo Lifetech Co., Ltd.).

In the composition of the present invention, an ultraviolet absorber may be used. Use of an ultraviolet absorber can increase the surface weather resistance of the cured article. Examples of the ultraviolet absorber may include benzophenone compounds, benzotriazole compounds, salicylate compounds, substituted tolyl compounds and metal chelate compounds; benzotriazole compounds are particularly preferable. The used amount of the ultraviolet absorber is such that the ultraviolet absorber is used within a range from 0.1 to 10 parts by weight, and further preferably from 0.2 to 5 parts by weight in relation to 100 parts by weight of the reactive silicon group-containing organic polymer (A). It is preferable that a phenol antioxidant, a hindered phenol antioxidant, a hindered amine photostabilizer and a benzotriazole ultraviolet absorber are used in combination.

To the composition of the present invention, an epoxy resin may be added. The composition added with an epoxy resin is particularly preferable as an adhesive, in particular, an adhesive for exterior wall tile. Examples of the epoxy resin may include: flame retardant epoxy resins such as epichlorohydrin-bisphenol A-type epoxy resins, epichlorohydrin-bisphenol F-type epoxy resins and glycidyl ether of tetrabromobisphenol A; novolac-type epoxy resins; hydrogenated bisphenol A-type epoxy resins; epoxy resins of the type of glycidyl ether of bisphenol A propyleneoxide adduct; p-oxybenzoic acid glycidyl ether ester-type epoxy resins; m-aminophenol epoxy resins; diaminodiphenylmethane epoxy resins; urethane-modified epoxy resins; various alicyclic epoxy resins; N,N-diglycidylaniline, N,N-diglycidyl-o-toluidine, triglycidyl isocyanurate, polyalkylene glycol diglycidyl ether and glycidyl ethers of polyhydric alcohols such as glycerin; hydantoin epoxy resins; and epoxidized substances of unsaturated polymers such as petroleum resins. However the epoxy resin is not limited to these examples, and commonly used epoxy resins may be used. Epoxy resins having at least two epoxy groups in one molecule thereof are preferable because such compositions are high in reactivity when curing is made, and the cured articles can easily form three dimensional networks. Examples of further preferable epoxy resins may include bisphenol A-type epoxy resins or novolac-type epoxy resins. The ratio of the used amount of each of these epoxy resins to the used amount of the reactive silicon group-containing organic polymer (A) falls, in terms of weight ratio, in the range such that (A)/epoxy resin=100/1 to 1/100. When the ratio of (A)/epoxy resin is less than 1/100, the effect of improving the impact strength and the toughness of the cured article of the epoxy resin is hardly obtainable, while when the ratio of (A)/epoxy resin exceeds 100/1, the strength of the cured article of the polymer is insufficient. The preferable ratio of the used amounts is varied depending on the application of the curable resin composition and hence cannot be unconditionally determined; for example, when the impact resistance, flexibility, toughness, and peel strength and the like of the cured article of the epoxy resin are to be improved, it is recommended that 1 to 100 parts by weight of the component (A), further preferably 5 to 100 parts by weight of the component (A) is used in relation to 100 parts by weight of the epoxy resin. On the other hand, when the strength of the cured article of the component (A) is to be improved, it is recommended that 1 to 200 parts by weight of the epoxy resin, further preferably 5 to 100 parts by weight of the epoxy resin is used in relation to 100 parts by weight of the component (A).

When the epoxy resin is added, as a matter of course, a curing agent to cure the epoxy resin can be applied together to the composition of the present invention. No particular constraint is imposed on the usable epoxy resin curing agent, and commonly used epoxy resin curing agents may be used. Specific examples of the epoxy resin curing agent may include: primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyethers; tertiary amines such as 2,4,6-tris(dimethylaminomethyl)phenol and tripropylamine, and salts of these tertiary amines; polyamide resins; imidazoles; dicyandiamides; borontrifluoride complexes; carboxylic acid anhydrides such as phthalic anhydride, hexahydrophthalic anhydride, tetrahydrophthalic anhydride, dodecynylsuccinic anhydride, pyromellitic anhydride and chlorenic anhydride; alcohols; phenols; carboxylic acids; and diketone complexes of aluminum and zirconium. However, the epoxy resin curing agent is not limited to these examples. Additionally, the curing agents may be used each alone or in combinations of two or more thereof.

When an epoxy resin curing agent is used, the used amount thereof falls within a range from 0.1 to 300 parts by weight in relation to 100 parts by weight of the epoxy resin.

As an epoxy resin curing agent, a ketimine may be used. A ketimine is stable when no moisture is present, but moisture decomposes the ketimine into a primary amine and a ketone; the thus produced primary amine acts as a room-temperature-curable curing agent to cure the epoxy resin. Use of a ketimine makes it possible to obtain a one part composition. Such a ketimine can be obtained by condensation reaction between an amine compound and a carbonyl compound.

For the synthesis of a ketimine, an amine compound and a carbonyl compound well known in the art can be used. For example, the following compounds may be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyamines such as 1,2,3-triaminopropane, triaminobenzene, tris(2-aminoethyl)amine and tetra(aminomethyl)methane; polyalkylenepolyamines such as diethylenetriamine, triethylenetetramine and tetraethylenepentamine; polyoxyalkylene polyamines; and aminosilanes such as γ-aminopropyltriethoxysilane, N-(β-aminoethyl)-γ-aminopropyltrimethoxysilane and N-(β-aminoethyl)-γ-aminopropylmethyldimethoxysilane. Additionally, the following compounds can be used as such a carbonyl compound: aldehydes such as acetoaldehyde, propionaldehyde, n-butylaldehyde, isobutylaldehyde, diethylacetoaldehyde, glyoxal and benzaldehyde; cyclic ketones such as cyclopentanone, trimethylcyclopentanone, cyclohexanone and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine, the imino group can be reacted with styrene oxide; glycidyl ethers such as butyl glycidyl ether and allyl glycidyl ether; glycidyl esters; and the like. These ketimines may be used each alone or in combinations of two or more thereof; these ketimines each are used within a range from 1 to 100 parts by weight in relation to 100 parts by weight of the epoxy resin, and the used amount of each of the ketimines is varied depending on the type of the epoxy resin and the type of the ketimine.

In the present invention, curing catalysts other than the component (B) may be used as long as the curing catalysts attain the advantageous effects of the present invention.

Examples of the curing catalysts other than the component (B) may include organotin compounds, alkoxy metal compounds, metal chelates, organic sulfonic acids (salts), acid phosphates and inorganic acids.

No particular constraint is imposed on the organotin compounds, and various types of compounds may be used. Specific examples of the organotin compounds may include:

dialkyltin carboxylates; dialkyltin oxides; and the compounds represented by the general formula (13):

$$R^{13}{}_d Sn(OQ)_{4-d} \text{ or } [R^{13}{}_2 Sn(OQ)]_2 O \quad (13)$$

wherein $R^{13}$ represents a monovalent hydrocarbon group having 1 to 20 carbon atoms; Q represents a monovalent hydrocarbon group having 1 to 20 carbon atoms or an organic group having therein one or more functional groups capable of forming coordination bonds with Sn; and d represents 1, 2, or 3. Reaction products of tetravalent tin compounds such as dialkyltin oxides and dialkyltin diacetates with low-molecular-weight, hydrolyzable silicon group-containing silicon compounds such as tetraethoxysilane, methyltriethoxysilane, diphenyldimethoxysilane and phenyltrimethoxysilane may also be used. Among these, those compounds represented by the general formula (13), namely, chelate compounds such as dibutyltin bisacetylacetonate and tin alcoholates are more preferable because these compounds are high in catalytic activity.

Specific examples of the dialkyltin carboxylates may include dibutyltin dilaurate, dibutyltin diacetate, dibutyltin di(2-ethylhexanoate), dibutyltin dioctate, dibutyltin dimethylmaleate, dibutyltin diethylmaleate, dibutyltin dibutylmaleate, dibutyltin diisooctylmaleate, dibutyltin tridecylmaleate, dibutyltin dibenzylmaleate, dibutyltin maleate, dioctyltin diacetate, dioctyltin distearate, dioctyltin dilaurate, dioctyltin diethylmaleate, and dioctyltin diisooctylmaleate. Additionally, alkylstannoxane carboxylates such as 1,1,3,3-tetrabutyl-1,3-dilauroyloxydistannoxane may also be used.

Specific examples of the dialkyltin oxides may include dibutyltin oxide, dioctyltin oxide, and reaction products of dibutyltin oxide with various ester compounds (dioctyl phthalate, dimethyl maleate and the like).

Specific examples of the chelate compounds may include the following compounds, but the chelate compounds concerned are not limited to these examples:

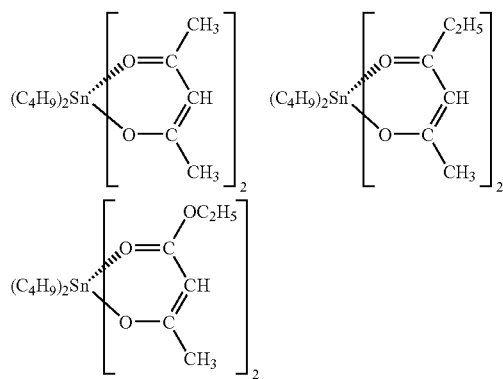

Among these, dibutyltin bisacetylacetonate is most preferable because it is high in catalytic activity, low in cost and easily available.

Specific examples of the tin alcoholates may include the following compounds, but the tin alcoholates concerned are not limited to these examples:

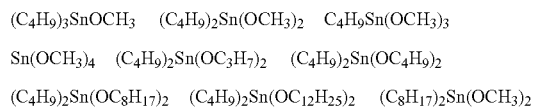

-continued

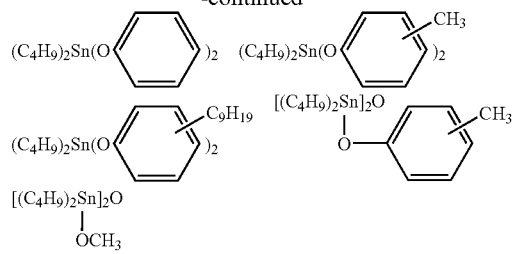

Among these, dialkyltin dialkoxides are preferable. In particular, dibutyltin dimethoxide is more preferable because it is low in cost and easily available.

Concomitant use of an organotin compound provides an effect to remarkably improve the curability in the thin layer portions.

Specific examples of the alkoxy metal compounds and the metal chelates may include: titanium alkoxides such as tetrabutyl titanate, tetraisopropyl titanate, tetramethyl titanate, tetra(2-ethylhexyl)titanate and triethanolamine titanate; titanium chelates such as titanium tetraacetylacetonate, titanium ethylacetonate, titanium lactate and diisopropoxy titanium bisacetylacetonate; aluminum alkoxides such as aluminum isopropylate, 2-butoxy diisopropoxy aluminum, and tri(2-butoxy)aluminum; aluminum chelates such as aluminum trisacetylacetonate, aluminum trisethyl acetoacetate, diisopropoxyaluminum ethylacetoacetate; zirconium alkoxides such as zirconium tetraisopropylate, zirconium tetra-n-propylate and zirconium n-butylate; zirconium chelates such as zirconium tetraacetylacetonate, zirconium bisacetylacetonate and zirconium acetylacetonate-bis-ethylacetoacetate; and other various metal alkoxides such as tetramethoxy tin and tetrabutoxy hafnium. However, the alkoxy metal compounds and the metal chelates concerned are not limited to these examples.

Examples of the organic sulfonic acid may include methanesulfonic acid, toluenesulfonic acid, styrenesulfonic acid and trifluoromethanesuflonic acid; and the salts of these acids may also be used.

The acid phosphate means a phosphoric acid ester which contains the moiety represented by —O—P(=O)OH, and may include the acid phosphates shown below. Organic acid phosphates are preferable from the viewpoints of compatibility and curing catalyst activity.

An organic acid phosphate compound is represented by $(R^{14}O)_e$—P(=O)(—OH)$_{3-e}$ wherein e represents 1 or 2; and $R^{14}$ represents an organic residue.

Specific examples thereof may include the following compounds; however the organic acid phosphate is not limited to these examples: (CH$_3$O)$_2$—P(=O)(—OH), (CH$_3$O)—P(=O)(—OH)$_2$, (C$_2$H$_5$O)$_2$—P(=O)(—OH), (C$_2$H$_5$O)—P(=O)(—OH)$_2$, (C$_3$H$_7$O)$_2$—P(=O)(—OH), (C$_3$H$_7$O)—P(=O)(—OH)$_2$, (C$_4$H$_9$O)$_2$—P(=O)(—OH), (C$_4$H$_9$O)—P(=O)(—OH)$_2$, (C$_8$H$_{17}$O)$_2$—P(=O)(—OH), (C$_8$H$_{17}$O)—P(=O)(—OH)$_2$, (C$_{10}$H$_{21}$O)$_2$—P(=O)(—OH), (C$_{10}$H$_{21}$O)—P(=O)(—OH)$_2$, (C$_{13}$H$_{27}$O)$_2$—P(=O)(—OH), (C$_{13}$H$_{27}$O)—P(=O)(—OH)$_2$, (C$_{16}$H$_{33}$O)$_2$—P(=O)(—OH), (C$_{16}$H$_{33}$O)—P(=O)(—OH)$_2$, (HO—C$_6$H$_{12}$O)$_2$—P(=O)(—OH), (HO—C$_6$H$_{12}$O)—P(=O)(—OH)$_2$, (HO—

$C_8H_{16}O)$—P(=O)(—OH), (HO—$C_8H_{16}O)$—P(=O)(—OH)$_2$, {($CH_2OH)(CHOH)O$}$_2$—P(=O)(—OH), {($CH_2OH)(CHOH)O$}—P(=O)(—OH)$_2$, {($CH_2OH)(CHOH)C_2H_4O$}$_2$—P(=O)(—OH) and {($CH_2OH)(CHOH)C_2H_4O$}—P(=O)(—OH)$_2$.

Examples of the inorganic acid may include hydrochloric acid, sulfuric acid, phosphoric acid and boronic acid.

To the curable composition of the present invention, various additives may be added according to need for the purpose of modifying the physical properties of the curable composition or the cured article. Examples of such additives may include a flame retardant, a curability modifier, a radical inhibitor, a metal deactivator, an antiozonant, a phosphorus based peroxide decomposer, a lubricant, a pigment, a foaming agent, a solvent and a mildewproofing agent. These various additives may be used each alone or in combinations of two or more thereof. Specific additive examples other than the specific examples cited in the present specification are described, for example, in Japanese Patent Publication Nos. 4-69659 and 7-108928, and Japanese Patent Laid-Open Nos. 63-254149, 64-22904, 2001-72854 and the like.

The curable composition of the present invention can also be prepared as a one-part composition in which all the ingredients are blended and hermetically stored in advance and the curing of the composition is carried out by the action of the moisture in the air after application of the composition. The curable composition of the present invention can also be prepared as two-part composition in which the ingredients such as a curing catalyst, a filler, a plasticizer, water and the like are blended in advance separately as a curing component, and the curing component composed of the blended ingredients and an organic polymer composition component are mixed together immediately before application. The one-part composition is preferable from the viewpoint of workability.

When the curable composition is of the one-part type, all the ingredients are blended together beforehand, so that it is preferable that the moisture-containing ingredients are used after dehydrating and drying, or the ingredients are dehydrated by reducing pressure or the like while being kneaded for blending. When the curable composition is of the two-part type, it is not necessary to blend a curing catalyst with the main part containing a reactive silicon group-containing organic polymer, and hence there is little fear of gelation even when some moisture is contained in the blended ingredients; however, when a long term storage stability is required, it is preferable to carry out dehydration and drying. As for the methods of dehydration and drying, a thermal drying method is suitable for a powdery solid substance or the like, while a reduced pressure dehydration method or a dehydration method which uses a synthetic zeolite, active alumina, silica gel or the like is suitable for a liquid substance. Additionally, there can be adopted a method in which a small amount of isocyanate compound is blended and the isocyanate group thereof is made to react with water to dehydrate. In addition to these dehydration and drying methods, addition of the following compounds further improves the storage stability: lower alcohols such as methanol and ethanol; and alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane and γ-glycidoxypropyltrimethoxysilane.

It is preferable that the used amount of a dehydrating agent, in particular, a silicon compound capable of reacting with water such as vinyltrimethoxysilane falls within a range from 0.1 to 20 parts by weight, and preferably 0.5 to 10 parts by weight in relation to 100 parts by weight of the reactive silicon group-containing organic polymer (A).

No particular constraint is imposed on the preparation method of the curable composition of the present invention; for example, there can be adopted a common method in which the above described ingredients are blended together and kneaded with a mixer, a roll, a kneader or the like at room temperature or under heating, or a common method in which the above described ingredients are dissolved and mixed by use of a small amount of an appropriate solvent.

The curable composition of the present invention forms three dimensional networks, when exposed to the air, due to the action of the moisture to be cured into a solid matter having a rubber-like elasticity.

EXAMPLES

The present invention will be described below in more detail with reference to examples, but the present invention is not limited only to these examples.

Examples 1 to 4 and Comparative Examples 1 and 2

According to the composition prescriptions given in Table 1, the following ingredients were taken and kneaded: 100 parts by weight of an organic polymer (ST-53 or ST-55, manufactured by Hanse Chemie) as the component (A) having one or more groups represented by the general formula (1) and having one or more reactive silicon groups,

$$-NR^1-C(=O)- \quad (1)$$

wherein $R^1$ is the same as above, 120 parts by weight of a surface treated precipitated calcium carbonate (Hakuenka CCR, manufactured by Shiraishi Kogyo Kaisha, Ltd.), 20 parts by weight of titanium oxide (Tipaque R-820, manufactured by Ishihara Sangyo Kaisha, Ltd.), 55 parts by weight of a plasticizer (diisodecyl phthalate (DIDP)), 2 parts by weight of thixotropic agent (Disparlon 6500, manufactured by Kusumoto Chemicals, Ltd.), 1 part by weight of a photostabilizer (Sanol LS770, manufactured by Sankyo Lifetech Co., Ltd.), 1 part by weight of an ultraviolet absorber (Tinuvin 327, manufactured by Ciba Specialty Chemicals K.K.), 1 part by weight of an antioxidant (Irganox 1010, manufactured by Ciba Specialty Chemicals K.K.), 2 parts by weight of a dehydrating agent, vinyltrimethoxysilane (A-171, manufactured by GE Toshiba Silicones Co., Ltd.), and 3 parts by weight of an adhesion-imparting agent, N-β-(aminoethyl)-γ-aminopropyltrimethoxysilane (A-1120, manufactured by GE Toshiba Silicones Co., Ltd.). Thereafter, to the mixture thus obtained, a tin carboxylate as the component (B) (tin (II) neodecanoate (trade name: U-50), manufactured by Nitto Kasei Co., Ltd.) and/or a carboxylic acid (neodecanoic acid (trade name: Versatic 10), manufactured by Japan Epoxy Resin Co., Ltd.), an amine as the component (C)(laurylamine (trade name: Farmin 20D), manufactured by Kao Corp.) were added in the amounts given in Table 1 in terms of parts by weight, and the mixture thus obtained was further kneaded to yield each of the curable compositions. On the other hand, in the comparative examples, 0.1 part by weight of an organotin catalyst (dibutyltin dilaurate (trade name: Stann-BL) manufactured by Sankyo Organic Chemicals Co., Ltd.) was added in place of the components (B) and (C), and then kneading was carried out to yield curable compositions.

(Curability Evaluation)

For the purpose of evaluating the curability of each of the compositions, the tack-free time was measured by means of the following method.

Each of the compositions given in Table 1 was extended so as to have a thickness of about 3 mm; and the elapsed time (tack-free time) until the composition no longer stained a finger when touched with the finger was measured under the conditions of 23° C. and a humidity of 50% RH. A shorter tack-free time indicates a better curability. The results obtained are shown in Table 1.

(Tensile Physical Properties of the Cured Articles)

Each of the compositions given in Table 1 was aged at 23° C. for 3 days and additionally at 50° C. for 4 days to yield a sheet of about 3 mm in thickness. Each of the thus obtained sheets was blanked into a No. 3 dumbbell-shaped specimen. For each of these dumbbell-shaped specimens, the tensile test was carried out under the conditions of 23° C. and a humidity of 50% RH at a tensile rate of 200 mm/min to measure the M50 (50% tensile modulus)(MPa). The results obtained are shown in Table 1.

(Heat Resistance)

Each of the dumbbell-shaped cured articles obtained by means of the above described method was aged in an oven at 90° C. for 14 days, and thereafter the M50 was measured in the same manner as described above. From the M50 values before and after curing at 90° C. for 14 days, the retention rates were derived. A higher M50 retention rate indicates a better heat resistance. The results obtained are shown in Table 1.

As shown in Table 1 under the headings of Comparative Examples 1 and 2, the retention rates of the M50 value are low when an organotin compound (Stann-BL) was used as a curing catalyst. On the other hand, as shown under the headings of Examples 1 to 4, in each of Examples, a practical curability was obtained and the retention rate of the M50 value was high when a metal carboxylate and/or a carboxylic acid as the component (B) of the present invention was used as a curing catalyst although the metal carboxylate and/or the carboxylic acid was a non-organotin catalyst.

baltate-glyme complex as a catalyst, polymerization of propylene oxide was carried out to yield a hydroxy group-terminated trifunctional polypropylene oxide having a number average molecular weight of about 26,000 (a molecular weight relative to polystyrene standards as measured by using an HLC-8120 GPC manufactured by Tosoh Corp. as a liquid delivery system, a column of TSK-GEL H-type manufactured by Tosoh Corp., and THF as a solvent).

To 100 parts by weight of the obtained hydroxy group-terminated polypropylene oxide, 2.1 parts by weight of γ-isocyanatepropyltrimethoxysilane was added, and the mixture was allowed to react at 90° C. for 5 hours to yield a trimethoxysilyl group-terminated polyoxypropylene polymer (A-1). On the basis of the measurement by $^1$H-NMR (measured in CDCl$_3$ as solvent by using a JNM-LA400 spectrometer manufactured by JEOL Ltd.), it was found that the number of the groups represented by the general formula (1) and the number of the terminal trimethoxysilyl groups each are 2.0 per one molecule on average:

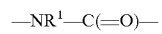

$$-NR^1-C(=O)- \quad (1)$$

wherein $R^1$ is the same as described above.

Examples 5 to 7 and Comparative Example 3

According to the composition prescriptions given in Table 2, curable compositions were produced in the same manner as described above except that, as the component (A), the polymer (A-1) obtained in Synthesis Example 1 was used in place of the ST-53 or ST-55 manufactured by Hanse Chemie. In the same manner as described above, for each of the compositions, the curability (tack-free time) thereof, and the tensile physical properties and the heat resistance of the cured article were evaluated. The results obtained are shown in Table 2.

As shown in Table 2 under the heading of Comparative Example 3, the retention rate of the M50 value was low when an organotin compound (Stann-BL) was used as a curing catalyst. On the other hand, as shown under the headings of Examples 5 to 7, in each of Examples, a practical curability was obtained and the retention rate of the M50 value was high

TABLE 1

| Composition (parts by weight) | | Examples | | | | Comparative examples | |
|---|---|---|---|---|---|---|---|
| | | 1 | 2 | 3 | 4 | 1 | 2 |
| Component (A) Silylated urethane polymers | ST-53 | 100 | 100 | | | 100 | |
| | ST-55 | | | 100 | 100 | | 100 |
| Fillers | Hakuenka CCR | 120 | 120 | 120 | 120 | 120 | 120 |
| | Tipaque R-820 | 20 | 20 | 20 | 20 | 20 | 20 |
| Plasticizer | DIDP | 55 | 55 | 55 | 55 | 55 | 55 |
| Thixotropic agent | Disparlon #6500 | 2 | 2 | 2 | 2 | 2 | 2 |
| Photostabilizer | Sanol LS-770 | 1 | 1 | 1 | 1 | 1 | 1 |
| Ultraviolet absorber | Tinuvin 327 | 1 | 1 | 1 | 1 | 1 | 1 |
| Antioxidant | Irganox 1010 | 1 | 1 | 1 | 1 | 1 | 1 |
| Dehydrating agent | A-171 | 2 | 2 | 2 | 2 | 2 | 2 |
| Adhesion-imparting agent | A-1120 | 3 | 3 | 3 | 3 | 3 | 3 |
| Component (B) Tin carboxylate | Neostann U-50 | 3.4 | | 3.4 | | | |
| Carboxylic acid | Versatic 10 | 1.2 | 6 | 1.2 | | 6 | |
| Component (C) Amine | Farmin 20D | 0.75 | 1 | 0.75 | | 1 | |
| Organotin compound | STANN BL | | | | | 0.1 | 0.1 |
| Tack-free time | (min) | 31 | 18 | 34 | 15 | 42 | 30 |
| M50 value before heat curing | (MPa) | 0.68 | 0.58 | 0.43 | 0.38 | 0.79 | 0.53 |
| Retention rate of M50 value after heat curing of 90° C. × 14 days | (%) | 80 | 92 | 72 | 82 | 68 | 58 |

Synthesis Example 1

By use of a polyoxypropylene triol having a molecular weight of about 3,000 as an initiator and zinc hexacyanocowhen a metal carboxylate and/or a carboxylic acid as the component (B) of the present invention was used as a curing catalyst although the metal carboxylate and/or the carboxylic acid was a non-organotin catalyst.

TABLE 2

| Composition (parts by weight) | | Examples 5 | Examples 6 | Examples 7 | Comparative example 3 |
|---|---|---|---|---|---|
| Component (A) Silylated urethane polymer | A-1 | 100 | 100 | 100 | 100 |
| Fillers | Hakuenka CCR | 120 | 120 | 120 | 120 |
|  | Tipaque R-820 | 20 | 20 | 20 | 20 |
| Plasticizer | DIDP | 55 | 55 | 55 | 55 |
| Thixotropic agent | Disparlon #6500 | 2 | 2 | 2 | 2 |
| Photostabilizer | Sanol LS-770 | 1 | 1 | 1 | 1 |
| Ultraviolet absorber | Tinuvin 327 | 1 | 1 | 1 | 1 |
| Antioxidant | Irganox 1010 | 1 | 1 | 1 | 1 |
| Dehydrating agent | A-171 | 2 | 2 | 2 | 2 |
| Adhesion-imparting agent | A-1120 | 3 | 3 | 3 | 3 |
| Component (B) Tin carboxylate | Neostann U-50 | 5 | 3.4 | | |
| Carboxylic acid | Versatic 10 | | 1.2 | 6 | |
| Component (C) Amine | Farmin 20D | 0.75 | 0.75 | 1 | |
| Organotin compound | STANN BL | | | | 0.1 |
| Tack-free time | (min) | 20 | 25 | 15 | 35 |
| M50 value before heat curing | (MPa) | 0.48 | 0.46 | 0.40 | 0.55 |
| Retention rate of M50 value after heat curing of 90° C. × 14 days | (%) | 85 | 87 | 95 | 72 |

Synthesis Example 2

By use of a polyoxypropylene diol having a molecular weight of about 2,000 as an initiator and zinc hexacyanocobaltate-glyme complex as a catalyst, polymerization of propylene oxide was carried out to yield a hydroxy group-terminated bifunctional polypropylene oxide (this will be referred to as the polymer P) having a number average molecular weight of about 25,500 (a molecular weight relative to polystyrene standards as measured by using an HLC-8120 GPC manufactured by Tosoh Corp. as a liquid delivery system, a column of TSK-GEL H-type manufactured by Tosoh Corp., and THF as a solvent).

To 100 parts by weight of the polymer P, 1.9 parts by weight of γ-isocyanatepropyltrimethoxysilane was added, and the mixture was allowed to react at 90° C. for 5 hours to yield a trimethoxysilyl group-terminated polyoxypropylene polymer (A-2). On the basis of the measurement by $^1$H-NMR (measured in CDCl$_3$ as solvent by using a JNM-LA400 spectrometer manufactured by JEOL Ltd.), it was found that the number of the groups represented by the general formula (1) and the number of the terminal trimethoxysilyl groups each are 1.5 per one molecule on average.

Synthesis Example 3

By use of a polypropylene glycol allyl ether [H$_2$C=CHCH$_2$O—(CH(CH$_3$)CH$_2$O)$_n$—H] having a molecular weight of about 1,500 as an initiator and zinc hexacyanocobaltate-glyme complex as a catalyst, polymerization of propylene oxide was carried out to yield a bifunctional polypropylene oxide, with a hydroxy group at one end thereof and an allyl group at the other end thereof, having a number average molecular weight of about 25,500 (a molecular weight relative to polystyrene standards as measured by using an HLC-8120 GPC manufactured by Tosoh Corp. as a liquid delivery system, a column of TSK-GEL H-type manufactured by Tosoh Corp., and THF as a solvent).

In the presence of 150 ppm of an isopropanol solution of platinum vinylsiloxane complex as a catalyst with a platinum content of 3 wt %, 100 parts by weight of the obtained bifunctional polypropylene oxide, with a hydroxy group at one end thereof and an allyl group at the other end thereof, was reacted with 1.0 part by weight of a silane compound represented by the following chemical formula,

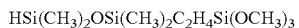

at 90° C. for 2 hours to yield a polyoxypropylene polymer containing 0.5 trimethoxysilyl group per one molecule on average and containing no group represented by the general formula (1).

To 100 parts by weight of this polymer, 1.3 parts by weight of γ-isocyanatepropyltrimethoxysilane was added, and the mixture was allowed to react at 90° C. for 5 hours to yield a trimethoxysilyl group-terminated polyoxypropylene polymer (A-3). On the basis of the measurement by $^1$H-NMR (measured in CDCl$_3$ as solvent by using a JNM-LA400 spectrometer manufactured by JEOL Ltd.), it was found that the number of the groups represented by the general formula (1) was 1.0 per one molecule on average and the number of the terminal trimethoxysilyl groups was 1.5 per one molecule on average.

Synthesis Example 4

A methanol solution of NaOMe was added in an amount of 1.2 equivalents in relation to the hydroxy groups of the hydroxy group-terminated bifunctional polypropylene oxide (the above described polymer P) having a number average molecular weight of 25,500, the methanol was distilled off, and allyl chloride was further added to thereby convert the terminal hydroxy groups into allyl groups. The unreacted allyl chloride was removed by volatilization under reduced pressure. To 100 parts by weight of the obtained, crude allyl group-terminated polypropylene oxide, 300 parts by weight of n-hexane and 300 parts by weight of water were added. The mixture thus obtained was stirred to mix, and then the water was removed by centrifugal separation. To the hexane solution thus obtained, 300 parts by weight of water was further added, the mixture thus obtained was stirred to mix, the water was again removed by centrifugal separation, and then the hexane was removed by volatilization under reduced pressure. Thus, an allyl group-terminated bifunctional polypropylene oxide having a number average molecular weight of about 25,500 was obtained.

In the presence of 150 ppm of an isopropanol solution of platinum vinylsiloxane complex as a catalyst with a platinum content of 3 wt %, 100 parts by weight of the obtained allyl-terminated polypropylene oxide was reacted with 3.1 parts by weight of a silane compound represented by the following chemical formula, HSi(CH$_3$)$_2$OSi(CH$_3$)$_2$C$_2$H$_4$Si(OCH$_3$)$_3$ at 90° C. for 2 hours to yield a trimethoxysilyl group-terminated polyoxypropylene polymer (A-4) containing no group represented by the general formula (1). On the basis of the measurement by $^1$H-NMR (measured in CDCl$_3$ as solvent by using a JNM-LA400 spectrometer manufactured by JEOL Ltd.), it was found that the number of the terminal trimethoxysilyl groups is 1.5 per one molecule on average.

Examples 8 to 11 and Comparative Examples 4 to 7

According to the composition prescriptions given in Table 3, curable compositions were prepared in the same manner as described above, by using as the component (A) the polymers (A-1 to A-4) obtained in Synthesis Examples 1 to 4, and the curability (tack-free time) of each of the compositions was evaluated in the same manner as described above. The results obtained are shown in Table 3.

As shown in Table 3, when there were used the polymers (A-1 and A-2) each having the 1.1 or more groups represented by the general formula (1) per one molecule on average, the curing rate was fast and a practical curability was attained:

—NR$^1$—C(=O)— (1)

wherein R$^1$ is the same as above.

packaging materials, sealants for joints in exterior materials such as sizing boards, coating materials, primers, electromagnetic wave shielding conductive materials, heat conducting materials, hot melt materials, electric and electronic potting agents, films, gaskets, various molding materials, antirust and waterproof sealants for edges (cut portions) of wire glass and laminated glass, vehicle components, electric appliance components, various machinery components and the like. Moreover, the curable composition of the present invention can adhere, by itself or with the aid of a primer, to a wide variety of substrates including glass, porcelain, woods, metals and molded resin articles, and accordingly, can be used as various types of hermetically sealing compositions and adhesive compositions.

The invention claimed is:

1. A curable composition comprising:
a polyoxypropylene polymer (A) which has on average 1.1 to 5 groups per one molecule thereof represented by the general formula (1) and has one or more silicon-containing functional groups capable of cross-linking by forming siloxane bonds:

—NR$^1$—C(=O)— (1)

wherein R$^1$ is a hydrogen atom, or a substituted or unsubstituted monovalent organic group;
tin neodecanoate (B),
a primary amine as a component (C),
a filler, and
a plasticizer,

TABLE 3

| | | | Examples | | | | Comparative examples | | | |
|---|---|---|---|---|---|---|---|---|---|---|
| Composition (parts by weight) | | | 8 | 9 | 10 | 11 | 4 | 5 | 6 | 7 |
| Reactive silicon group- containing polymers | A-1 | 2.0(*) | 100 | 100 | | | | | | |
| | A-2 | 1.5(*) | | | 100 | 100 | | | | |
| | A-3 | 1.0(*) | | | | | 100 | 100 | | |
| | A-4 | 0.0(*) | | | | | | | 100 | 100 |
| Fillers | Hakuenka CCR | | 120 | 120 | 120 | 120 | 120 | 120 | 120 | 120 |
| | Tipaque R-820 | | 20 | 20 | 20 | 20 | 20 | 20 | 20 | 20 |
| Plasticizer | DIDP | | 55 | 55 | 55 | 55 | 55 | 55 | 55 | 55 |
| Thixotropic agent | Disparlon #6500 | | 2 | 2 | 2 | 2 | 2 | 2 | 2 | 2 |
| Photostabilizer | Sanol LS-770 | | 1 | 1 | 1 | 1 | 1 | 1 | 1 | 1 |
| Ultraviolet absorber | Tinuvin 327 | | 1 | 1 | 1 | 1 | 1 | 1 | 1 | 1 |
| Antioxidant | Irganox 1010 | | 1 | 1 | 1 | 1 | 1 | 1 | 1 | 1 |
| Dehydrating agent | A-171 | | 2 | 2 | 2 | 2 | 2 | 2 | 2 | 2 |
| Adhesion-imparting agent | A-1120 | | 3 | 3 | 3 | 3 | 3 | 3 | 3 | 3 |
| Component (B) Tin carboxylate | Neostann U-50 | | 3.4 | | 3.4 | | 3.4 | | 3.4 | |
| Carboxylic acid | Versatic 10 | | 2.6 | | 2.6 | | 2.6 | | 2.6 | |
| Component (C) Amine | Diethylaminopropylamine | | 1 | 1 | 1 | 1 | 1 | 1 | 1 | 1 |
| Tack-free time | (min) | | 25 | 27 | 34 | 37 | 60 | 65 | 95 | 100 |

(*)The average number of the —NR$^1$—C(=O)— groups per one polymer molecule.

INDUSTRIAL APPLICABILITY

The curable composition of the present invention can be used as tackifiers; sealants for buildings, ships, vehicles and road; adhesives; mold forming materials; vibration proof materials; damping materials; soundproof materials; foaming materials; coating materials; spraying materials and the like. Additionally, the curable composition of the present invention can be used in various applications as liquid sealants or the like to be used in materials for electric and electronic components such as backside sealants for solar cells, electric insulating materials such as insulating coating materials for use in electric wire and cable, elastic adhesives, powdery coating materials, casting materials, medical rubber materials, medical adhesives, medical instrument sealants, food wherein
the plasticizer is phthalate,
an amount of the tin neodecanoate (B) is 0.5 to 10 parts by weight in relation to 100 parts by weight of the polyoxypropylene polymer (A),
an amount of the component (C) is 0.1 to 5 parts by weight in relation to 100 parts by weight of the polyoxypropylene polymer (A),
an amount of the filler is 10 to 200 parts by weight in relation to 100 parts by weight of the polyoxypropylene polymer (A), and
an amount of the plasticizer is 20 to 100 parts by weight in relation to 100 parts by weight of the polyoxypropylene polymer (A).

2. The curable composition according to claim 1, wherein the polyoxypropylene polymer (A) has on average 1.5 to 2 groups per one molecule thereof represented by the general formula (1).

3. The curable composition according to claim 1, wherein the polyoxypropylene polymer (A) is produced by following production methods (a) or (b):

the production method (a) in which an excessive amount of a polyisocyanate compound (E) is reacted with a polyoxypropylene polymer (D) having active hydrogen-containing groups at the terminals thereof to convert the polyoxypropylene polymer (D) into a polymer having isocyanate groups at the terminals of the polyurethane main chain thereof, and thereafter, or at the same time, the whole isocyanate groups or a part of the isocyanate groups are reacted with the W group of a silicon compound (F) represented by formula (7) to produce the polyoxypropylene polymer (A):

$$W-R^5-SiR^4_{3-c}X_c \quad (7)$$

wherein $R^4$ is an alkyl group having 1 to 20 carbon atoms, an aryl group having 6 to 20 carbon atoms, an aralkyl group having 7 to 20 carbon atoms, or a triorganosiloxy group represented by $(R')_3SiO-$, and when there are two or more $R^4$s, they may be the same or different from each other; R' represents a monovalent hydrocarbon group having 1 to 20 carbon atoms, and 3 R's may be the same or different from each other; X represents a hydroxy group or a hydrolyzable group, and when there are two or more Xs, they may be the same or different from each other; c represents an integer of 1 to 3; $R^5$ is a divalent organic group; and W is an active hydrogen-containing group selected from the group consisting of a hydroxy group, a carboxyl group, a mercapto group and a primary or secondary amino group; or the production method (b) in which an hydrolyzable silicon group-containing isocyanate compound (G) represented by formula (8) is reacted with the polyoxypropylene polymer (D) having active hydrogen-containing groups at the terminals thereof to produce the polyoxypropylene polymer (A):

$$O=C=N-R^5-SiR^4_{3-c}X_c \quad (8)$$

wherein $R^4$, $R^5$, X and c are the same as described above.

4. The curable composition according to claim 3, wherein $R^5$ is a substituted or unsubstituted divalent hydrocarbon group having 1 to 20 carbon atoms.

5. The curable composition according to claim 1, wherein the plasticizer is diisodecyl phthalate.

6. The curable composition according to claim 1, wherein the silicon-containing functional group capable of cross-linking by forming siloxane bonds is a trimethoxysilyl group.

7. A curable composition comprising:

a polyoxypropylene polymer (A) which has on average 1.1 to 5 groups per one molecule thereof represented by the general formula (1) and has one or more silicon-containing functional groups capable of cross-linking by forming siloxane bonds:

$$-NR^1-C(=O)- \quad (1)$$

wherein $R^1$ is a hydrogen atom, or a substituted or unsubstituted monovalent organic group; and a component (B) which is a carboxylic acid, an amine compound as a component (C), a filler, and a plasticizer, wherein the carbon atom adjacent to the carbonyl group of the carboxylic acid is a quaternary carbon atom, the plasticizer is phthalate, an amount of component (B) is 0.5 to 10 parts by weight in relation to 100 parts by weight of the polyoxypropylene polymer (A), an amount of the component (C) is 0.1 to 5 parts by weight in relation to 100 parts by weight of the polyoxypropylene polymer (A), an amount of the filler is 10 to 200 parts by weight in relation to 100 parts by weight of the polyoxypropylene polymer (A), and an amount of the plasticizer is 20 to 100 parts by weight in relation to 100 parts by weight of the polyoxypropylene polymer (A).

8. The curable composition according to claim 7, wherein the polyoxypropylene polymer (A) has on average 1.5 to 2 groups per one molecule thereof represented by the general formula (1).

9. The curable composition according to claim 7, wherein the component (B) is neodecanoic acid.

10. The curable composition according to claim 7, wherein the plasticizer is diisodecyl phthalate.

11. The curable composition according to claim 7, wherein the silicon-containing functional group capable of cross-linking by forming siloxane bonds is a trimethoxysilyl group.

* * * * *